United States Patent
Frenz

(10) Patent No.: US 10,802,459 B2
(45) Date of Patent: Oct. 13, 2020

(54) GEO-FENCING WITH ADVANCED INTELLIGENT RECOVERY

(71) Applicant: Ademco Inc., Golden Valley, MN (US)

(72) Inventor: Jonathan P. Frenz, Minneapolis, MN (US)

(73) Assignee: Ademco Inc., Golden Valley, MN (US)

( * ) Notice: Subject to any disclaimer, the term of this patent is extended or adjusted under 35 U.S.C. 154(b) by 733 days.

(21) Appl. No.: 14/696,725

(22) Filed: Apr. 27, 2015

(65) Prior Publication Data

US 2016/0313749 A1 Oct. 27, 2016

(51) Int. Cl.
*G05D 23/13* (2006.01)
*G05B 19/10* (2006.01)
(Continued)

(52) U.S. Cl.
CPC .......... *G05B 19/106* (2013.01); *F24F 11/00* (2013.01); *F24F 11/30* (2018.01); *F24F 11/62* (2018.01); *G05B 13/023* (2013.01); *G05B 15/02* (2013.01); *G05D 23/1905* (2013.01); *H04L 12/282* (2013.01); *H04L 12/2823* (2013.01);
(Continued)

(58) Field of Classification Search
CPC .......... G05B 19/106; G05B 2219/2614; G05D 23/1905; H04L 12/28; H04L 12/282; H04L 12/2823; H04L 67/125; H04W 4/021; H04W 4/029; H04W 4/33; F24F 11/00; F24F 11/30; F24F 11/62
See application file for complete search history.

(56) References Cited

U.S. PATENT DOCUMENTS 3,472,452 A 10/1969 Beeston, Jr.
3,581,985 A 6/1971 Thorsteinsson et al.
(Continued)

FOREIGN PATENT DOCUMENTS

AU 2015201441 A1 10/2015
CA 2202008 10/1998
(Continued)

OTHER PUBLICATIONS

"BACnet Direct Digital Control Systems for HVAC," Whole NOSC Facility Modernization, Greensboro, NC, GRN98471, 40 pages, Aug. 2009.
(Continued)

*Primary Examiner* — Mark A Connolly
(74) *Attorney, Agent, or Firm* — Shumaker & Sieffert, P.A.

(57) ABSTRACT

A building temperature may be allowed to deviate from a comfort temperature set point to an energy saving temperature when a user is outside the geo-fence. Crossing information indicating when a user crosses into the geo-fence may be received. The crossing information may be stored over time to develop a history of when the user crosses into the geo-fence. A probability function that operates on at least part of the stored crossing information may be used to predict a time range of when the user is expected to next arrive at the building, the time range having a starting time and an ending time. The HVAC system may be instructed to drive the building temperature to an intermediate temperature at the starting time of the time range, wherein the intermediate temperature is between the energy saving temperature and the comfort temperature set point.

20 Claims, 10 Drawing Sheets

(51) Int. Cl.
*F24F 11/00* (2018.01)
*F24F 11/30* (2018.01)
*F24F 11/62* (2018.01)
*G05B 13/02* (2006.01)
*H04L 12/28* (2006.01)
*G05D 23/19* (2006.01)
*H04W 4/021* (2018.01)
*H04L 29/08* (2006.01)
*H04W 4/029* (2018.01)
*G05B 15/02* (2006.01)
*H04W 4/33* (2018.01)
*F24F 11/64* (2018.01)
*F24F 11/46* (2018.01)

(52) U.S. Cl.
CPC ........... *H04L 67/125* (2013.01); *H04W 4/021* (2013.01); *H04W 4/029* (2018.02); *H04W 4/33* (2018.02); *F24F 11/46* (2018.01); *F24F 11/64* (2018.01); *G05B 2219/2614* (2013.01)

(56) References Cited

U.S. PATENT DOCUMENTS

| | | |
|---|---|---|
| 3,665,360 A | 5/1972 | Norden |
| 3,784,094 A | 1/1974 | Goodwin |
| 3,817,453 A | 6/1974 | Pinckaers |
| 3,972,471 A | 8/1976 | Ziegler |
| 3,979,708 A | 9/1976 | Thompson |
| 3,988,708 A | 10/1976 | Thorsteinsson et al. |
| 4,016,520 A | 4/1977 | Hummel |
| 4,089,462 A | 5/1978 | Bradford |
| 4,114,681 A | 9/1978 | Denny |
| 4,176,785 A | 12/1979 | Allard et al. |
| 4,187,543 A | 2/1980 | Healey et al. |
| 4,205,381 A | 5/1980 | Games et al. |
| 4,215,408 A | 7/1980 | Games et al. |
| 4,223,831 A | 9/1980 | Szarka |
| 4,228,511 A | 10/1980 | Simcoe et al. |
| 4,235,368 A | 11/1980 | Neel |
| 4,251,025 A | 2/1981 | Bonne et al. |
| 4,253,153 A | 2/1981 | Bitterli et al. |
| 4,266,599 A | 5/1981 | Saunders et al. |
| 4,270,693 A | 6/1981 | Hayes |
| 4,300,199 A | 11/1981 | Yoknis et al. |
| 4,314,441 A | 2/1982 | Pannone et al. |
| 4,329,138 A | 5/1982 | Riordan |
| 4,334,855 A | 6/1982 | Nelson |
| 4,335,847 A | 6/1982 | Levine |
| 4,338,791 A | 7/1982 | Stamp, Jr. et al. |
| 4,340,355 A | 7/1982 | Nelson et al. |
| 4,341,345 A | 7/1982 | Hammer et al. |
| 4,347,974 A | 9/1982 | Pinckaers et al. |
| 4,366,534 A | 12/1982 | Kompelien |
| 4,373,897 A | 2/1983 | Torborg |
| 4,386,649 A | 6/1983 | Hines et al. |
| 4,387,763 A | 6/1983 | Benton |
| 4,388,692 A | 6/1983 | Jones et al. |
| 4,421,268 A | 12/1983 | Bassett et al. |
| 4,429,829 A | 2/1984 | Dutton |
| 4,435,149 A | 3/1984 | Astheimer |
| 4,439,139 A | 3/1984 | Nelson et al. |
| 4,442,972 A | 4/1984 | Sahay et al. |
| 4,489,882 A | 12/1984 | Rodgers |
| 4,502,625 A | 3/1985 | Mueller |
| 4,531,064 A | 7/1985 | Levine |
| 4,533,315 A | 8/1985 | Nelson |
| 4,577,278 A | 3/1986 | Shannon |
| 4,598,764 A | 7/1986 | Beckey |
| 4,656,835 A | 4/1987 | Kidder et al. |
| 4,684,060 A | 8/1987 | Adams et al. |
| 4,685,614 A | 8/1987 | Levine |
| 4,686,060 A | 8/1987 | Crabtree et al. |
| 4,688,547 A | 8/1987 | Ballard et al. |
| 4,702,413 A | 10/1987 | Beckey et al. |
| 4,703,795 A | 11/1987 | Beckey |
| 4,708,636 A | 11/1987 | Johnson |
| 4,729,207 A | 3/1988 | Dempsey et al. |
| 4,751,961 A | 6/1988 | Levine et al. |
| 4,759,498 A | 7/1988 | Levine et al. |
| 4,767,104 A | 8/1988 | Plesinger |
| 4,799,176 A | 1/1989 | Cacciatore |
| 4,817,705 A | 4/1989 | Levine et al. |
| 4,819,587 A | 4/1989 | Tsutsui et al. |
| 4,828,016 A | 5/1989 | Brown et al. |
| 4,881,686 A | 11/1989 | Mehta |
| 4,892,245 A | 1/1990 | Dunaway et al. |
| 4,901,918 A | 2/1990 | Grald et al. |
| 4,911,358 A | 3/1990 | Mehta |
| 4,915,615 A | 4/1990 | Kawamura et al. |
| 4,941,609 A | 7/1990 | Bartels et al. |
| 4,971,136 A | 11/1990 | Mathur et al. |
| 5,002,226 A | 3/1991 | Nelson |
| 5,026,270 A | 6/1991 | Adams et al. |
| 5,070,932 A | 12/1991 | Vlasak |
| 5,088,645 A | 2/1992 | Bell |
| 5,115,967 A | 5/1992 | Wedekind |
| 5,115,968 A | 5/1992 | Grald |
| 5,192,020 A | 3/1993 | Shah |
| 5,197,666 A | 3/1993 | Wedekind |
| 5,211,332 A | 5/1993 | Adams |
| 5,240,178 A | 8/1993 | Dewolf et al. |
| 5,248,083 A | 9/1993 | Adams et al. |
| 5,259,445 A | 11/1993 | Pratt et al. |
| 5,270,952 A | 12/1993 | Adams et al. |
| 5,289,362 A | 2/1994 | Liebl et al. |
| 5,299,631 A | 4/1994 | Dauvergne |
| 5,314,004 A | 5/1994 | Strand et al. |
| 5,317,670 A | 5/1994 | Elia |
| 5,331,944 A | 7/1994 | Kujawa et al. |
| 5,340,028 A | 8/1994 | Thompson |
| 5,347,981 A | 9/1994 | Southern et al. |
| 5,370,990 A | 12/1994 | Staniford et al. |
| 5,395,042 A | 3/1995 | Riley et al. |
| 5,405,079 A | 4/1995 | Neeley et al. |
| 5,408,986 A | 4/1995 | Bigham |
| 5,454,511 A | 10/1995 | Van Ostrand et al. |
| 5,456,407 A | 10/1995 | Stalsberg et al. |
| 5,476,221 A | 12/1995 | Seymour |
| 5,485,953 A | 1/1996 | Bassett et al. |
| 5,520,533 A | 5/1996 | Vrolijk |
| 5,524,556 A | 6/1996 | Rowlette et al. |
| 5,539,633 A | 7/1996 | Hildebrand et al. |
| 5,555,927 A | 9/1996 | Shah |
| 5,590,642 A | 1/1997 | Borgeson et al. |
| 5,601,071 A | 2/1997 | Carr et al. |
| 5,607,014 A | 3/1997 | Van Ostrand et al. |
| 5,611,484 A | 3/1997 | Uhrich |
| 5,616,995 A | 4/1997 | Hollenbeck |
| 5,622,310 A | 4/1997 | Meyer |
| 5,630,408 A | 5/1997 | Versluis |
| 5,666,889 A | 9/1997 | Evens et al. |
| 5,676,069 A | 10/1997 | Hollenbeck |
| 5,680,029 A | 10/1997 | Smits et al. |
| 5,682,826 A | 11/1997 | Hollenbeck |
| 5,720,231 A | 2/1998 | Rowlette et al. |
| 5,732,691 A | 3/1998 | Maiello et al. |
| 5,791,332 A | 8/1998 | Thompson et al. |
| 5,806,440 A | 9/1998 | Rowlette et al. |
| 5,819,721 A | 10/1998 | Carr et al. |
| 5,822,997 A | 10/1998 | Atterbury |
| 5,860,411 A | 1/1999 | Thompson et al. |
| 5,865,611 A | 2/1999 | Maiello |
| 5,902,183 A | 5/1999 | D'Souza |
| 5,909,378 A | 6/1999 | De Milleville |
| 5,977,964 A | 11/1999 | Williams |
| 5,993,195 A | 11/1999 | Thompson |
| 6,000,622 A | 12/1999 | Tonner et al. |
| 6,062,482 A | 5/2000 | Gauthier et al. |
| 6,098,893 A | 8/2000 | Berglund et al. |
| 6,109,255 A | 8/2000 | Dieckmann et al. |
| 6,216,956 B1 | 4/2001 | Ehlers et al. |
| 6,254,008 B1 | 7/2001 | Erickson et al. |
| 6,255,988 B1 | 7/2001 | Bischoff |

(56) References Cited

U.S. PATENT DOCUMENTS

| | | | |
|---|---|---|---|
| 6,257,870 B1 | 7/2001 | Hugghins et al. |
| 6,260,765 B1 | 7/2001 | Natale et al. |
| 6,283,115 B1 | 9/2001 | Dempsey et al. |
| 6,321,744 B1 | 11/2001 | Dempsey et al. |
| 6,349,883 B1 | 2/2002 | Simmons et al. |
| 6,354,327 B1 | 3/2002 | Mayhew |
| 6,356,282 B2 | 3/2002 | Roytman et al. |
| 6,357,870 B1 | 3/2002 | Beach et al. |
| 6,377,426 B2 | 4/2002 | Hugghins et al. |
| 6,400,956 B1 | 6/2002 | Richton |
| 6,402,043 B1 | 6/2002 | Cockerill |
| 6,478,233 B1 * | 11/2002 | Shah ............... G05D 23/1904 236/46 R |
| 6,504,338 B1 | 1/2003 | Eichorn |
| 6,529,137 B1 | 3/2003 | Roe |
| 6,571,817 B1 | 6/2003 | Bohan, Jr. |
| 6,604,023 B1 | 8/2003 | Brown et al. |
| 6,645,066 B2 | 11/2003 | Gutta et al. |
| 6,665,613 B2 | 12/2003 | Duvall |
| 6,705,533 B2 | 3/2004 | Casey et al. |
| 6,729,390 B1 | 5/2004 | Toth et al. |
| 6,749,423 B2 | 6/2004 | Fredricks et al. |
| 6,758,909 B2 | 7/2004 | Jonnalagadda et al. |
| 6,764,298 B2 | 7/2004 | Kim et al. |
| 6,769,482 B2 | 8/2004 | Wagner |
| 6,786,225 B1 | 9/2004 | Stark et al. |
| 6,793,015 B1 | 9/2004 | Brown et al. |
| 6,846,514 B2 | 1/2005 | Jonnalagadda et al. |
| 6,866,202 B2 | 3/2005 | Sigafus et al. |
| 6,880,548 B2 | 4/2005 | Schultz et al. |
| 6,909,891 B2 | 6/2005 | Yamashita et al. |
| 6,918,756 B2 | 7/2005 | Fredricks et al. |
| 6,923,643 B2 | 8/2005 | Schultz et al. |
| 6,925,999 B2 | 8/2005 | Hugghins et al. |
| 6,990,335 B1 | 1/2006 | Shamoon et al. |
| 7,024,336 B2 | 4/2006 | Salsbury et al. |
| 7,055,759 B2 | 6/2006 | Wacker et al. |
| 7,073,365 B2 | 7/2006 | Gebo et al. |
| 7,083,109 B2 | 8/2006 | Pouchak |
| 7,099,748 B2 | 8/2006 | Rayburn |
| 7,101,172 B2 | 9/2006 | Jaeschke |
| 7,111,503 B2 | 9/2006 | Brumboiu et al. |
| 7,113,086 B2 | 9/2006 | Shorrock |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,185,825 B1 | 3/2007 | Rosen |
| 7,188,779 B2 | 3/2007 | Alles |
| 7,191,826 B2 | 3/2007 | Byrnes et al. |
| 7,216,016 B2 | 5/2007 | Van Ostrand et al. |
| 7,228,693 B2 | 6/2007 | Helt |
| 7,241,135 B2 | 7/2007 | Munsterhuis et al. |
| 7,257,397 B2 | 8/2007 | Shamoon et al. |
| 7,293,718 B2 | 11/2007 | Sigafus et al. |
| 7,327,250 B2 | 2/2008 | Harvey |
| 7,343,226 B2 | 3/2008 | Ehlers et al. |
| 7,385,500 B2 | 6/2008 | Irwin |
| RE40,437 E | 7/2008 | Rosen |
| 7,392,661 B2 | 7/2008 | Alles |
| 7,432,477 B2 | 10/2008 | Teti |
| D580,801 S | 11/2008 | Takach et al. |
| 7,451,017 B2 | 11/2008 | McNally |
| 7,451,612 B2 | 11/2008 | Mueller et al. |
| 7,469,550 B2 | 12/2008 | Chapman, Jr. et al. |
| 7,510,126 B2 | 3/2009 | Rossi et al. |
| 7,555,364 B2 | 6/2009 | Poth et al. |
| 7,571,865 B2 | 8/2009 | Nicodem et al. |
| 7,574,208 B2 | 8/2009 | Hanson et al. |
| 7,580,775 B2 | 8/2009 | Kujyk et al. |
| 7,584,021 B2 | 9/2009 | Bash et al. |
| 7,599,808 B2 | 10/2009 | Weekly |
| 7,614,567 B2 | 11/2009 | Chapman et al. |
| 7,636,604 B2 | 12/2009 | Bergman et al. |
| 7,644,869 B2 | 1/2010 | Hoglund et al. |
| 7,668,532 B2 | 2/2010 | Shamoon et al. |
| 7,693,809 B2 | 4/2010 | Gray |
| 7,707,428 B2 | 4/2010 | Poth et al. |
| 7,720,621 B2 | 5/2010 | Weekly |
| 7,735,743 B2 | 6/2010 | Jaeschke |
| 7,768,393 B2 | 8/2010 | Nigam |
| 7,784,704 B2 | 8/2010 | Harter |
| 7,801,646 B2 | 9/2010 | Amundson et al. |
| 7,802,618 B2 | 9/2010 | Simon et al. |
| 7,812,274 B2 | 10/2010 | Dupont et al. |
| 7,839,275 B2 | 11/2010 | Spalink et al. |
| 7,848,900 B2 | 12/2010 | Steinberg |
| 7,854,389 B2 | 12/2010 | Ahmed |
| 7,861,547 B2 | 1/2011 | Major et al. |
| 7,861,941 B2 | 1/2011 | Schultz et al. |
| 7,904,608 B2 | 3/2011 | Price |
| 7,908,211 B1 | 3/2011 | Chen et al. |
| 7,918,406 B2 | 4/2011 | Rosen |
| 7,945,799 B2 | 5/2011 | Poth et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,019,567 B2 | 9/2011 | Steinberg et al. |
| 8,026,261 B2 | 9/2011 | Tam et al. |
| 8,027,518 B2 | 9/2011 | Baker et al. |
| 8,032,254 B2 | 10/2011 | Amundson et al. |
| 8,064,935 B2 | 11/2011 | Shamoon et al. |
| 8,065,342 B1 | 11/2011 | Borg et al. |
| 8,078,325 B2 | 12/2011 | Poth |
| 8,087,593 B2 | 1/2012 | Leen |
| 8,090,477 B1 | 1/2012 | Steinberg |
| 8,091,795 B1 | 1/2012 | McLellan et al. |
| 8,091,796 B2 | 1/2012 | Amundson et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,126,685 B2 | 2/2012 | Nasle |
| 8,131,401 B2 | 3/2012 | Nasle |
| 8,135,413 B2 | 3/2012 | Dupray |
| 8,140,279 B2 | 3/2012 | Subbloie |
| 8,141,791 B2 | 3/2012 | Rosen |
| 8,146,584 B2 | 4/2012 | Thompson |
| 8,150,421 B2 | 4/2012 | Ward et al. |
| 8,180,492 B2 | 5/2012 | Steinberg |
| 8,195,313 B1 | 6/2012 | Fadell et al. |
| 8,204,628 B2 | 6/2012 | Schnell et al. |
| 8,205,244 B2 | 6/2012 | Nightingale et al. |
| 8,219,114 B2 | 7/2012 | Larsen |
| 8,219,249 B2 | 7/2012 | Harrod et al. |
| 8,229,722 B2 | 7/2012 | Nasle |
| 8,229,772 B2 | 7/2012 | Tran et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,280,559 B2 | 10/2012 | Herman et al. |
| 8,301,765 B2 | 10/2012 | Goodman |
| 8,305,935 B2 | 11/2012 | Wang |
| 8,315,717 B2 | 11/2012 | Forbes, Jr. et al. |
| 8,323,081 B2 | 12/2012 | Koizumi et al. |
| 8,332,055 B2 | 12/2012 | Veillette |
| 8,334,906 B2 | 12/2012 | Lipton et al. |
| 8,346,396 B2 | 1/2013 | Amundson et al. |
| 8,350,697 B2 | 1/2013 | Trundle et al. |
| 8,386,082 B2 | 2/2013 | Oswald |
| 8,390,473 B2 | 3/2013 | Krzyzanowski et al. |
| 8,406,162 B2 | 3/2013 | Haupt et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,796 B2 | 6/2013 | Thind |
| 8,457,797 B2 | 6/2013 | Imes et al. |
| 8,498,753 B2 | 7/2013 | Steinberg et al. |
| 8,509,954 B2 | 8/2013 | Imes et al. |
| 8,510,241 B2 | 8/2013 | Seshan |

(56) References Cited

U.S. PATENT DOCUMENTS

| | | |
|---|---|---|
| 8,510,255 B2 | 8/2013 | Fadell et al. |
| 8,510,421 B2 | 8/2013 | Matsuzaki et al. |
| 8,531,294 B2 | 9/2013 | Slavin et al. |
| 8,543,244 B2 | 9/2013 | Keeling et al. |
| 8,554,374 B2 | 10/2013 | Lunacek et al. |
| 8,554,714 B2 | 10/2013 | Raymond et al. |
| 8,556,188 B2 | 10/2013 | Steinberg |
| 8,560,127 B2 | 10/2013 | Leen et al. |
| 8,571,518 B2 | 10/2013 | Imes et al. |
| 8,577,392 B1 | 11/2013 | Pai et al. |
| 8,587,445 B2 | 11/2013 | Rockwell |
| 8,596,550 B2 | 12/2013 | Steinberg et al. |
| 8,606,374 B2 | 12/2013 | Fadell et al. |
| 8,620,393 B2 | 12/2013 | Bornstein et al. |
| 8,620,841 B1 | 12/2013 | Filson et al. |
| 8,626,344 B2 | 1/2014 | Imes et al. |
| 8,630,741 B1 | 1/2014 | Matsuoka et al. |
| 8,634,796 B2 | 1/2014 | Johnson |
| 8,648,706 B2 | 2/2014 | Ranjun et al. |
| 8,666,558 B2 | 3/2014 | Wang et al. |
| 8,670,783 B2 | 3/2014 | Klein |
| 8,686,841 B2 | 4/2014 | Macheca et al. |
| 8,718,826 B2 | 5/2014 | Ramachandran et al. |
| 8,725,831 B2 | 5/2014 | Barbeau et al. |
| 8,731,723 B2 | 5/2014 | Boll et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,868,254 B2 | 10/2014 | Louboutin |
| 8,874,129 B2 | 10/2014 | Forutanpour et al. |
| 8,876,013 B2 | 11/2014 | Amundson et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,954,201 B2 | 2/2015 | Tepper et al. |
| 8,965,401 B2 | 2/2015 | Sheshadri et al. |
| 8,965,406 B2 | 2/2015 | Henderson |
| 9,020,647 B2 | 4/2015 | Johnson et al. |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,125 B1 | 12/2015 | Nichols |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,280,559 B1 | 3/2016 | Jones |
| 9,288,620 B2 | 3/2016 | Menendez |
| 9,292,022 B2 | 3/2016 | Ramachandran et al. |
| 9,363,638 B1 | 3/2016 | Jones |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,636 B2 | 6/2016 | Ganesh et al. |
| 9,363,772 B2 | 6/2016 | Burks |
| 9,396,344 B1 | 7/2016 | Jones |
| 9,414,422 B2 | 8/2016 | Belghoul et al. |
| 9,432,807 B2 | 8/2016 | Kern, Jr. et al. |
| 9,433,681 B2 | 9/2016 | Constien et al. |
| 9,449,491 B2 | 9/2016 | Sager et al. |
| 9,477,239 B2 | 10/2016 | Bergman et al. |
| 9,491,577 B1 | 11/2016 | Jones |
| 9,495,866 B2 | 11/2016 | Roth et al. |
| 9,521,519 B2 | 12/2016 | Chiou et al. |
| 9,552,002 B2 | 1/2017 | Sloo et al. |
| 9,560,482 B1 | 1/2017 | Frenz |
| 9,589,435 B2 | 3/2017 | Finlow-Bates |
| 9,594,384 B2 | 3/2017 | Bergman et al. |
| 9,609,478 B2 | 3/2017 | Frenz et al. |
| 9,618,227 B2 | 4/2017 | Drew |
| 9,628,951 B1 | 4/2017 | Kolavennu et al. |
| 9,635,500 B1 | 4/2017 | Becker et al. |
| 9,645,589 B2 | 5/2017 | Leen et al. |
| 9,674,658 B2 | 6/2017 | Partheesh et al. |
| 9,900,174 B2 | 2/2018 | Gamberini |
| 9,979,763 B2 | 5/2018 | Nichols |
| 2002/0147006 A1 | 10/2002 | Coon et al. |
| 2002/0155405 A1 | 10/2002 | Casey et al. |
| 2004/0034484 A1 | 2/2004 | Solomita, Jr. et al. |
| 2005/0128067 A1 | 6/2005 | Zakrewski |
| 2005/0172056 A1 | 8/2005 | Ahn |
| 2005/0189429 A1 | 9/2005 | Breeden |
| 2006/0063522 A1 | 3/2006 | McFarland |
| 2006/0097063 A1 | 5/2006 | Zeevi |
| 2006/0196953 A1 | 9/2006 | Simon et al. |
| 2007/0037605 A1 | 2/2007 | Logan |
| 2007/0043478 A1 | 2/2007 | Ehlers et al. |
| 2007/0060171 A1 | 3/2007 | Sudit et al. |
| 2007/0099626 A1 | 5/2007 | Lawrence et al. |
| 2007/0114295 A1 | 5/2007 | Jenkins |
| 2007/0235179 A1 | 10/2007 | Phillips |
| 2007/0239316 A1 | 10/2007 | Jelinek et al. |
| 2007/0249319 A1 | 10/2007 | Faulkner et al. |
| 2008/0094230 A1 | 4/2008 | Mock et al. |
| 2008/0098760 A1 | 5/2008 | Seefeldt |
| 2008/0127963 A1 | 6/2008 | Thompson |
| 2008/0143550 A1 | 6/2008 | Ebrom et al. |
| 2008/0217419 A1 | 9/2008 | Ehlers et al. |
| 2008/0262820 A1 | 10/2008 | Nasle |
| 2009/0012704 A1 | 1/2009 | Franco et al. |
| 2009/0143880 A1 | 6/2009 | Amundson et al. |
| 2009/0171862 A1 | 7/2009 | Harrod et al. |
| 2009/0187499 A1 | 7/2009 | Mulder et al. |
| 2009/0240381 A1 | 9/2009 | Lane |
| 2009/0302994 A1 | 12/2009 | Rhee et al. |
| 2009/0308372 A1 | 12/2009 | Nordberg et al. |
| 2010/0025483 A1 | 2/2010 | Hoeynck |
| 2010/0034386 A1 | 2/2010 | Choong et al. |
| 2010/0042940 A1 | 2/2010 | Monday et al. |
| 2010/0065245 A1 | 3/2010 | Imada et al. |
| 2010/0081375 A1 | 4/2010 | Rosenblatt et al. |
| 2010/0084482 A1 | 4/2010 | Kennedy et al. |
| 2010/0127854 A1 | 5/2010 | Helvick et al. |
| 2010/0156628 A1 | 6/2010 | Ainsbury et al. |
| 2010/0261465 A1 | 10/2010 | Rhoads et al. |
| 2011/0015352 A1 | 1/2011 | Steffen et al. |
| 2011/0046805 A1 | 2/2011 | Bedros et al. |
| 2011/0148634 A1* | 6/2011 | Putz ............... G08B 21/22 |
| | | 340/541 |
| 2011/0153525 A1 | 6/2011 | Benco et al. |
| 2011/0185895 A1 | 8/2011 | Freen |
| 2011/0214060 A1 | 9/2011 | Imes et al. |
| 2011/0314144 A1 | 12/2011 | Goodman |
| 2012/0065802 A1 | 3/2012 | Seeber et al. |
| 2012/0085831 A1 | 4/2012 | Kopp |
| 2012/0095614 A1 | 4/2012 | DeLayo |
| 2012/0172027 A1 | 7/2012 | Partheesh et al. |
| 2012/0185101 A1 | 7/2012 | Leen |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0284769 A1 | 11/2012 | Dixon et al. |
| 2013/0073094 A1* | 3/2013 | Knapton ............... F24F 11/0034 |
| | | 700/278 |
| 2013/0204441 A1 | 8/2013 | Sloo et al. |
| 2013/0225196 A1 | 8/2013 | James et al. |
| 2013/0226352 A1 | 8/2013 | Dean-Hendricks et al. |
| 2013/0231137 A1 | 9/2013 | Hugie et al. |
| 2013/0267253 A1 | 10/2013 | Case et al. |
| 2013/0310053 A1 | 11/2013 | Srivastava et al. |
| 2013/0318217 A1 | 11/2013 | Imes et al. |
| 2013/0331087 A1 | 12/2013 | Shoemaker et al. |
| 2013/0331128 A1 | 12/2013 | Qiu |
| 2014/0031989 A1 | 1/2014 | Bergman et al. |
| 2014/0031991 A1 | 1/2014 | Bergman et al. |

(56) References Cited

U.S. PATENT DOCUMENTS

| | | |
|---|---|---|
| 2014/0039692 A1 | 2/2014 | Leen et al. |
| 2014/0045482 A1 | 2/2014 | Bisson et al. |
| 2014/0100835 A1 | 4/2014 | Majumdar et al. |
| 2014/0156087 A1 | 6/2014 | Amundson |
| 2014/0164118 A1 | 6/2014 | Polachi |
| 2014/0172176 A1 | 6/2014 | Deilmann et al. |
| 2014/0200718 A1 | 7/2014 | Tessier |
| 2014/0244048 A1 | 8/2014 | Ramachandran et al. |
| 2014/0248910 A1 | 9/2014 | Dave et al. |
| 2014/0266635 A1 | 9/2014 | Roth et al. |
| 2014/0266669 A1* | 9/2014 | Fadell ............. G05B 19/042 340/501 |
| 2014/0277762 A1 | 9/2014 | Drew |
| 2014/0302879 A1 | 10/2014 | Kim et al. |
| 2014/0313032 A1 | 10/2014 | Sager et al. |
| 2014/0324410 A1* | 10/2014 | Mathews ............. G09B 25/00 703/22 |
| 2014/0330435 A1 | 11/2014 | Stoner et al. |
| 2014/0337123 A1 | 11/2014 | Neurenberg et al. |
| 2014/0349672 A1 | 11/2014 | Kern et al. |
| 2014/0370911 A1 | 12/2014 | Gorgenyi et al. |
| 2015/0065161 A1 | 3/2015 | Ganesh et al. |
| 2015/0094860 A1 | 4/2015 | Finnerty et al. |
| 2015/0100167 A1* | 4/2015 | Sloo .................. H04L 67/025 700/278 |
| 2015/0140994 A1 | 5/2015 | Partheesh et al. |
| 2015/0141045 A1 | 5/2015 | Qiu et al. |
| 2015/0156031 A1* | 6/2015 | Fadell ............... H04L 12/2816 700/276 |
| 2015/0159895 A1 | 6/2015 | Quam et al. |
| 2015/0163631 A1 | 6/2015 | Quam et al. |
| 2015/0163945 A1 | 6/2015 | Barton et al. |
| 2015/0167999 A1* | 6/2015 | Seem ................. F24F 11/30 700/276 |
| 2015/0180713 A1* | 6/2015 | Stewart ............. H04L 41/0813 709/220 |
| 2015/0181382 A1 | 6/2015 | McDonald et al. |
| 2015/0186497 A1 | 7/2015 | Patton et al. |
| 2015/0228419 A1* | 8/2015 | Fadell ............... G08B 17/00 307/112 |
| 2015/0237470 A1* | 8/2015 | Mayor .............. G01C 21/3617 455/456.2 |
| 2015/0271638 A1 | 9/2015 | Menayas et al. |
| 2015/0285527 A1* | 10/2015 | Kim .................. F24F 11/64 700/276 |
| 2015/0301543 A1 | 10/2015 | Janoso et al. |
| 2015/0309484 A1* | 10/2015 | Lyman ............... G05B 13/0205 700/275 |
| 2015/0338116 A1 | 11/2015 | Furuta et al. |
| 2015/0370272 A1 | 12/2015 | Reddy et al. |
| 2015/0372832 A1 | 12/2015 | Kortz et al. |
| 2016/0007156 A1 | 1/2016 | Chiou et al. |
| 2016/0018122 A1 | 1/2016 | Frank |
| 2016/0018800 A1* | 1/2016 | Gettings ............. G05B 15/02 700/19 |
| 2016/0018832 A1* | 1/2016 | Frank ............... F24F 11/006 700/276 |
| 2016/0054865 A1 | 2/2016 | Kerr et al. |
| 2016/0057572 A1 | 2/2016 | Bojorquez et al. |
| 2016/0142872 A1 | 5/2016 | Nicholson et al. |
| 2016/0189496 A1 | 6/2016 | Modi et al. |
| 2016/0195861 A1* | 7/2016 | Chen ................. H04L 12/2816 700/275 |
| 2016/0223998 A1* | 8/2016 | Songkakul .......... H04W 4/021 |
| 2016/0261424 A1 | 9/2016 | Gamberini |
| 2016/0286033 A1 | 9/2016 | Frenz et al. |
| 2016/0313749 A1 | 10/2016 | Frenz |
| 2016/0313750 A1 | 10/2016 | Frenz et al. |
| 2017/0026506 A1 | 1/2017 | Haepp et al. |
| 2017/0130979 A1 | 5/2017 | Kolavennu et al. |
| 2017/0134214 A1 | 5/2017 | Sethuraman et al. |
| 2017/0139580 A1* | 5/2017 | Kimura ............. G06F 1/3206 |
| 2017/0171704 A1 | 6/2017 | Frenz |
| 2017/0181100 A1 | 6/2017 | Kolavennu et al. |
| 2017/0241660 A1 | 8/2017 | Sekar et al. |
| 2018/0241789 A1 | 8/2018 | Nichols |

FOREIGN PATENT DOCUMENTS

| | | |
|---|---|---|
| CN | 101689327 | 5/2013 |
| CN | 103175287 A | 6/2013 |
| CN | 104704863 A | 6/2015 |
| CN | 105318499 A | 2/2016 |
| DE | 102013226390 A1 | 6/2015 |
| EP | 0196069 | 10/1986 |
| EP | 1515289 | 3/2005 |
| EP | 2607802 | 6/2013 |
| EP | 2675195 A2 | 12/2013 |
| EP | 3001116 A1 | 3/2016 |
| JP | 59-106311 | 6/1984 |
| JP | 1-252850 | 10/1989 |
| JP | 2011203841 A | 10/2011 |
| JP | 2012109680 A | 6/2012 |
| MX | 2012000906 | 9/2012 |
| WO | 2006055334 A1 | 5/2006 |
| WO | 2009034720 | 3/2009 |
| WO | 2009036764 A2 | 3/2009 |
| WO | WO 2009/034720 | 3/2009 |
| WO | WO 2009/036764 | 3/2009 |
| WO | 2009067251 A1 | 5/2009 |
| WO | WO 2009/067251 | 5/2009 |
| WO | 2011011404 A1 | 1/2011 |
| WO | WO 2011/011404 | 1/2011 |
| WO | 2011121299 A1 | 10/2011 |
| WO | 2012000107 A1 | 1/2012 |
| WO | WO 2012/000107 | 1/2012 |
| WO | 2012068517 A1 | 5/2012 |
| WO | 2013170791 A1 | 11/2013 |
| WO | WO 2013/170791 | 11/2013 |
| WO | 2014016705 A2 | 1/2014 |
| WO | WO 2014/016705 | 1/2014 |
| WO | 2014047501 A1 | 3/2014 |
| WO | WO 2014/047501 | 3/2014 |
| WO | 2014055939 A1 | 4/2014 |
| WO | 2014144323 A1 | 9/2014 |
| WO | WO 2014/144323 | 9/2014 |
| WO | 2014197320 A1 | 12/2014 |
| WO | 2014200524 A2 | 12/2014 |
| WO | WO 2014/197320 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

Aprilaire "Electronic Thermostats Model 8355 7 Day Programmable 2 Heat/2 Cool Heat Pump, User's Manual, Installation, and Programming," pp. 1-16, Dec. 2000.

Bishop, "Adaptive Identification and Control of HVAC Systems," USA CER, Technical Report E-85, 50 pages, Sep. 1985.

Braeburn, "Model 5200 Premier Series Programmable Thermostats. Up to 2 Heat/2 Cool 7 Day, 5-2 Day or Non-Programmable Conventional and Heat Pump," 11 pages, 2011.

Braeburn, "Model 5300 Premier Series Universal Auto Changeover, Up to 3 Heat/2 Cool Heat Pump or 2 Heat/2Cool Conversion Thermostat, User Manual," 2009.

California Energy Commission, "Buildings End-Use Energy Efficiency, Alternatives to Compressor Cooling," 80 pages, Jan. 2000.

Carrier, "SYSTXCCUIZ01-V Infinity Control, Installation Instructions," pp. 1-20, 2012.

Carrier, "TB-PAC, TB-PHP Base Series Programmable Thermostats, Installation Instructions," 4 pages, 2012.

U.S. Appl. No. 14/640,984, filed Mar. 6, 2015.
U.S. Appl. No. 14/668,800, filed Mar. 25, 2015.
U.S. Appl. No. 14/696,662, filed Apr. 27, 2015.
U.S. Appl. No. 14/933,948, filed Nov. 5, 2015.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.

(56) References Cited

OTHER PUBLICATIONS

U.S. Appl. No. 14/964,264, filed Dec. 9, 2015.
U.S. Appl. No. 14/964,349, filed Dec. 9, 2015.
DeLeeuw, "Ecobee Wifi Enabled Smart Thermostat Part 2: The Features Review," 7 pages, Apr. 1, 2014.
Ecobee, "Smart Si Thermostat User Manual," 44 pages, 2012.
Ecobee, "Smart Thermostat Installation Manual," pp. 1-36, 2011.
Ecobee, "Smart Thermostat User Manual," 20 pages, 2010.
Federspiel et al., "User Adaptable Comfort Control for HVAC Systems," Proceedings of the 1992 American Control Conference, pp. 2312-2319, Jun. 24-26, 1992.
Fong et al., "A Robust Evolutionary Algorithm for HVAC Engineering Optimization," HVAC C&R Research, vol. 14, No. 5, pp. 683-705, Sep. 2008.
Gao, "The Self-Programming Thermostat: Optimizing Setback Schedules Based on Home Occupancy Patterns," BuildSys '09, 6 pages, Nov. 3, 2009.
Hai, "Omnistat RC-Series Electronic Communicating Thermostats," 2 pages, prior to Jan. 13, 2011.
Honeywell, "45.801.175—Amplification Gas/Air Module for VK4105R/VK8105R Gas Controls," 8 pages, prior to Oct. 18, 2006.
Honeywell, "FocusPRO 6000 Series Programmable Thermostat, User Guide," 24 pages, Dec. 2013.
Honeywell, "FocusPRO TH6000 Series Programmable Thermostat, Operating Manual," 26 pages, Mar. 2011.
Honeywell, "FocusPRO Wi-Fi TH6000 Series Programmable Thermostat, Installation Guide," 36 pages, 2012.
Honeywell, "Perfect Climate Comfort Center Control System, Product Data," 44 pages, Apr. 2001.
Honeywell, Prestige THX9321/9421 Operating Manual, 120 pages, Jul. 2011.
Honeywell, "T8611G Chronotherm IV Deluxe Programmable Heat Pump Thermostats, Installation Instructions," 12 pages, 2002.
Honeywell, "T8624D Chronotherm IV Deluxe Programmable Thermostat, Product Data," 20 pages, Oct. 1997.
Honeywell, "THX9321 Prestige 2.0 and THX9421 Prestige IAQ with EIM," Product Data, 160 pages, Apr. 2013.
Honeywell, "VisionPRO IAQ, Installation Guide," 24 pages, Jul. 2009.
Honeywell, "VisionPRO TH8000 Series Installation Guide," 12 pages, 2012.
Honeywell, "VisionPRO TH8000 Series Operating Manual," 64 pages, 2007.
Honeywell, "VK41..R/VK81..R Series, Gas Controls with Integrated Gas/Air for Combined Valve and Ignition System," 6 pages, prior to Oct. 18, 2006.
http://www.ecobee.com/solutions/whats-new/, "Introducing the New Smart Si Thermostat," 1 page, printed Apr. 1, 2014.
http://www.regal-beloit.comgedrafthtml., "Regal-Beloit ECM, formerly GE ECM, Draft Inducer Motors, (44 Frame)," 1 page, printed Apr. 26, 2006.
Kuntze et al., "A New Fuzzy-Based Supervisory Control Concept for the Demand-Responsive Optimization of HVAC Control Systems," Proceedings of the 37th IEEE Conference on Decision & Control, Tampa, Fl, pp. 4258-4263, 1998.
Lennox, "ComfortSense 5000 Series Models L5711U and 5732U Programmable Touch Screen Thermostats," Owner's Guide, 32 pages, Feb. 2008.
Lennox, "G61MPV Series Unit, Installation Instructions," 2 pages, Oct. 2006.
Lennox, "G61MPV Series Unit, Installation Instructions," 68 pages, Jan. 2010.
Lennox, "Homeowner's Manual, Comfortsense 7000 Series, Model L7742U Touch Screen Programmable Thermostat," 15 pages, May 2009.
Lennox, "icomfort Touch Thermostat, Homeowner's Manual," Controls 506053-01, 20 pages, Dec. 2010.
Lu et al., "The Smart Thermostat: Using Occupancy Sensors to Save Energy in Homes," Sensys'10, 14 pages, Nov. 3-5, 2010.
Luxpro, "Luxpro PSPU732T 3 Heating and 2 Cooling with Automatic Humidity Control and Dual Fuel Switch, Instruction Manual," 48 pages, downloaded Apr. 5, 2014.
Robertshaw, "9620 7 Day Programmable 2 Heat/2Cool User's Manual," 13 pages, 2001.
Robertshaw, "9801i2, 9825i2 Deluxe Programmable Thermostats, User's Manual," 36 pages, Jul. 17, 2006.
Trane, "ComfortLink II Installation Guide," 18-HD64D1-3, 20 pages, Aug. 2011.
Trane, "Communicating Thermostats for Fan Coil Control Echelon Version X13511543020, BACnet MS-TP Version X13511543010, User Guide," 32 pages, May 3, 2011.
Trane, "TCONT600AF11MA Programmable Comfort Control, Installation Instructions," Pub. No. 18-HD25D20-3, 16 pages, 2006.
Utkin et al., "Automobile Climate Control Using Sliding Mode," IEEE International Electric Machines and Drives Conference, 18 pages, Jun. 17-20, 2001.
Venstar, "Commercial Thermostat T2900 7-Day Programmable Up to 3-Heat & 2 Cool, Owner's Manual," 113 pages, Apr. 2008.
Venstar, "Residential Thermostat T5800 Owner's Manual and Installation Instructions," 64, pages, downloaded Apr. 9, 2014.
Washington State University, Extension Energy Program, "Electric Heat Lock Out on Heat Pumps," pp. 1-3, Apr. 2010.
White Rodgers, "Emerson Blue Wireless Comfort Interface 1F98EZ-1621 Homeowner User Guide," 28 pages, downloaded Apr. 5, 2014.
www.networkthermostat.com, "Net/X Wifi Thermostat," 2 pages, 2012.
Yan et al., "Iterative Learning Control in Large Scale HVAC System," IEEE Proceedings of the 8th World Congress on Intelligent Control and Automation, Jul. 6-9, 2010, Jinan, China, 2010.
Zaheer-Uddin et al., "Optimal Control of Time-Scheduled Heating, Ventilating and Air Conditioning Processes in Buildings," Energy Conversion & Management, vol. 41, pp. 49-60, 2000.
Zaheer-Uddin, "Digital Control of a Heat Recovery and Storage System," Heat Recovery Systems & CHP, vol. 10, No. 5/6, pp. 583-593, 1990.
U.S. Appl. No. 15/048,902, filed Feb. 19, 2016.
Balaji et al., "Sentinel: Occupancy Based HVAC Actuation Using Existing WiFi Infrastructure Within Commercial Buildings," SenSys '13, 14 pages, Nov. 11-15, 2015.
"Petition for Inter Partes Review of U.S. Pat. No. 8,571,518 Pursuant to 35 U.S.C. 311-319, 37 CFR 42," Inventor Imes et al., dated Oct. 29, 2014.
Do, "Programmable Communicating Thermostats for Demand Response in California," DR ETD Workshop, 26 pages, Jun. 11, 2007.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," 89 pages, Sep. 2008.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.
http://www.allure-energy.com/aenf_jan9_12.html, "CES Gets First Look at EverSense," Allure Energy, 2 pages, printed Feb. 17, 2015.
http://IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Mobile Integrated Solutions, LLC, "MobiLinc Take Control of Your Home, MobiLinc and Geo-Fence Awareness," 9 pages, downloaded Mar. 27, 2015.
Pan et al., "A Framework for Smart Location-Based Automated Energy Controls in a Green Building Testbed," 6 pages, downloaded Jan. 30, 2015.

(56) References Cited

OTHER PUBLICATIONS

SmartThings Inc., "2 Ecobee Si Thermostat + Geofencing," 17 pages, downloaded Nov. 3, 2014.
Allure Energy, "Our Technology," http://www.allure-energy.com/pages/about.jsp 1 page, printed May 30, 2012.
The Extended European Search Report for EP Application No. 16195639.6, dated May 31, 2017.
The International Search Report for PCT Application No. PCT/US2010/042589 dated Nov. 22, 2010.
Mozer, "The Neural Network House: An Environment that Adapts to Its Inhabitants," Department of Computer Science, University of Colorado, 5 pages, downloaded May 29, 2012.
The Extended European Search Report and Opinion for EP Application No. 16156760.7-1862, dated Jul. 8, 2016.
The Extended European Search Report for EP Application No. 1619416, dated Feb. 2, 2017.
The Extended European Search Report for EP Application No. 16196128.9, dated Mar. 7, 2017.
Gentec, "Feature Focus, Threat Level Management," 2 pages, 2013.
Scanlon et al., "Mutual Information Based Visual Feature Selection for Lipreading," 8th International Conference on Spoken Language Processing, 5 pages, Oct. 4-8, 2004.
Transportation Research Board of the National Academies, "Commuting in America III, the Third National Report on Commuting Patterns and Trends," 199 pages, 2006.

\* cited by examiner

GEO-FENCING WITH ADVANCED INTELLIGENT RECOVERY

TECHNICAL FIELD

The disclosure relates generally to building automation and more particularly to building automation systems with geo-fencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. For example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to a locked or away state when in an unoccupied mode and an unlocked or home state when in an occupied mode.

SUMMARY

The present disclosure pertains generally to geo-fencing, and more particularly to building automation systems with geo-fencing capabilities. An example of the disclosure may be found in a method of implementing advanced intelligent recovery (AIR) in an HVAC system for a building. The HVAC system may implement geo-fencing using a geo-fence that is defined for the building or for one or more individual users of the building. A building temperature may be allowed to deviate from a comfort temperature set point to an energy saving temperature when a user is outside the geo-fence. Crossing information indicating when a user crosses into the geo-fence may be received. The crossing information may be stored over time to develop a history of when the user crosses into the geo-fence. At least some of the stored crossing information may be processed to determine a comfort time that is related to when the user is expected to next arrive at the building. The HVAC system may be programmed to drive the building temperature towards the comfort temperature set point based on the comfort time. In some cases, the comfort time is based at least in part upon an average value of at least some of the stored crossing information. In some instances, the HVAC system may be instructed to drive the building temperature to reach the comfort temperature set point by the comfort time.

In some instances, processing at least some of the stored crossing information may include using a probability function that operates on at least part of the stored crossing information in order to predict a time range of when the user is expected to next arrive at the building. The time range may have a starting time and an ending time, where the comfort time is at or between the starting time and the ending time. The HVAC system may be programmed to drive the building temperature to an intermediate temperature between the energy saving temperature and the comfort temperature set point at the starting time of the time range. In some cases, the HVAC system may be further programmed to drive the building temperature to the comfort temperature set point by at least the ending time of the time range. In some instances, the user may be permitted to select a balance between comfort and energy savings. When so provided, the intermediate temperature may be determined at least in part based upon the selected balance between comfort and energy savings.

Another example of the disclosure may be found in a method of implementing advanced intelligent recovery (AIR) in an HVAC system for a building. The HVAC system may implement geo-fencing using a geo-fence that is defined for the building. A building temperature may be allowed to deviate from the comfort temperature set point to an energy saving temperature when all of a plurality of users are determined to be outside of the geo-fence. Crossing information indicating when each of the users crosses into the geo-fence may be received. The crossing information may be stored over time for each of the plurality of users to develop a history of when each of the plurality of users crosses into the geo-fence. A probability function that operates on at least part of the stored crossing information may be used to predict a time range of when each of the plurality of users is expected to next arrive at the building. Each time range may have a starting time and an ending time. The HVAC system may be programmed to drive the building temperature to an intermediate temperature by the starting time of the time range that corresponds to the particular user that is expected to arrive first at the building.

Another example of the disclosure may be found in an HVAC control system for controlling operation of HVAC equipment within a building. The HVAC control system may be configured to be in operative communication with a user's mobile device running an executable program (e.g. application program) that provides geo-fence functionality. The HVAC control system may include an input for receiving crossing information indicating when the user's mobile device crosses into a geo-fence that is defined for the building. The HVAC control system has a memory for storing the crossing information over time to develop a history of when the user's mobile device crosses into the geo-fence. The HVAC control system may further have a controller that is operatively coupled to the input and the memory. The controller may be configured to control the HVAC equipment and allow a building temperature in the building to deviate from a comfort temperature set point to an energy saving temperature when the user's mobile device is outside the geo-fence. The controller may be configured to use a probability function that operates on at least part of the stored crossing information to predict a time range of when the user's mobile device is expected to next arrive at the building. The time range may have a starting time and an ending time. The controller may be further configured to control the HVAC equipment to drive the building temperature to an intermediate temperature that is between the energy saving temperature and the comfort temperature set point by the starting time of the time range.

Another example of the disclosure may be found in an HVAC controller configured to operate HVAC equipment within a building. A user of the building may have a mobile device with location services. The HVAC controller may include a memory for storing at least two targets. One of the at least two targets including a starting time point and an intermediate temperature set point. Another of the at least two targets including an ending time point and a comfort temperature set point. A communications module may receive the at least two targets from a remote server. An equipment interface may provide control signals to the HVAC equipment. A controller of the HVAC controller may be operably coupled to the memory, the communications module and the equipment interface, and may be configured to operate the HVAC equipment, via the equipment interface, in accordance with at least two targets received via the communications module and stored in the memory. The controller may be further configured to calculate one or more heating or cooling ramps based upon the at least two targets such that the building will attain the intermediate temperature set point by the starting time point and the building will attain the comfort temperature set point at or before the ending time point.

Figure 1:
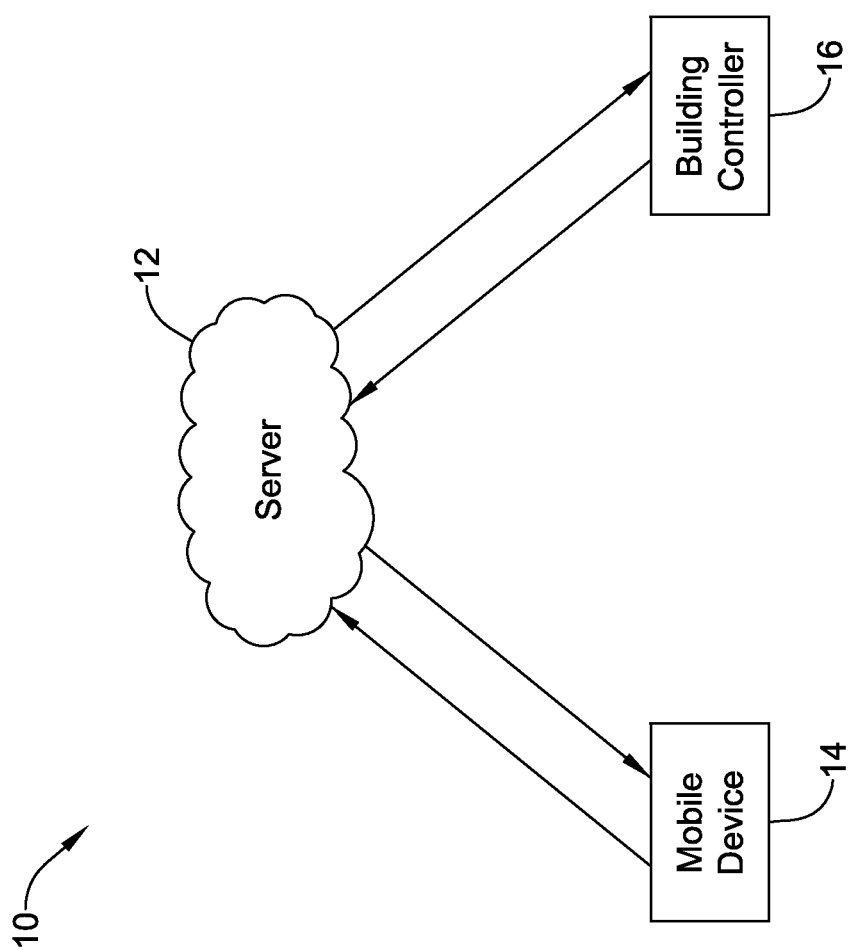
FIG. 1 is a schematic view of an illustrative building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices that can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic illustration of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network.

Figure 2:
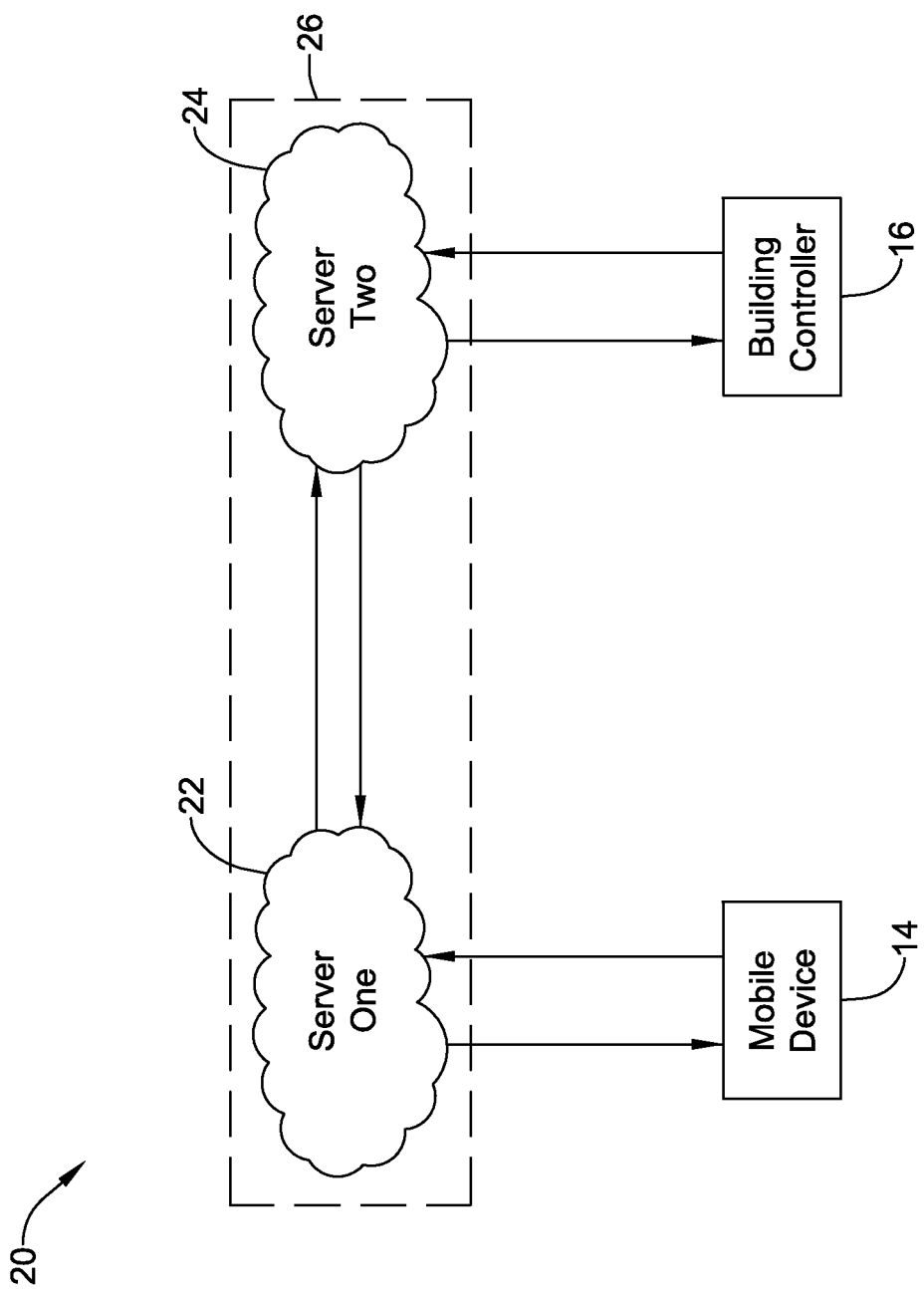
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
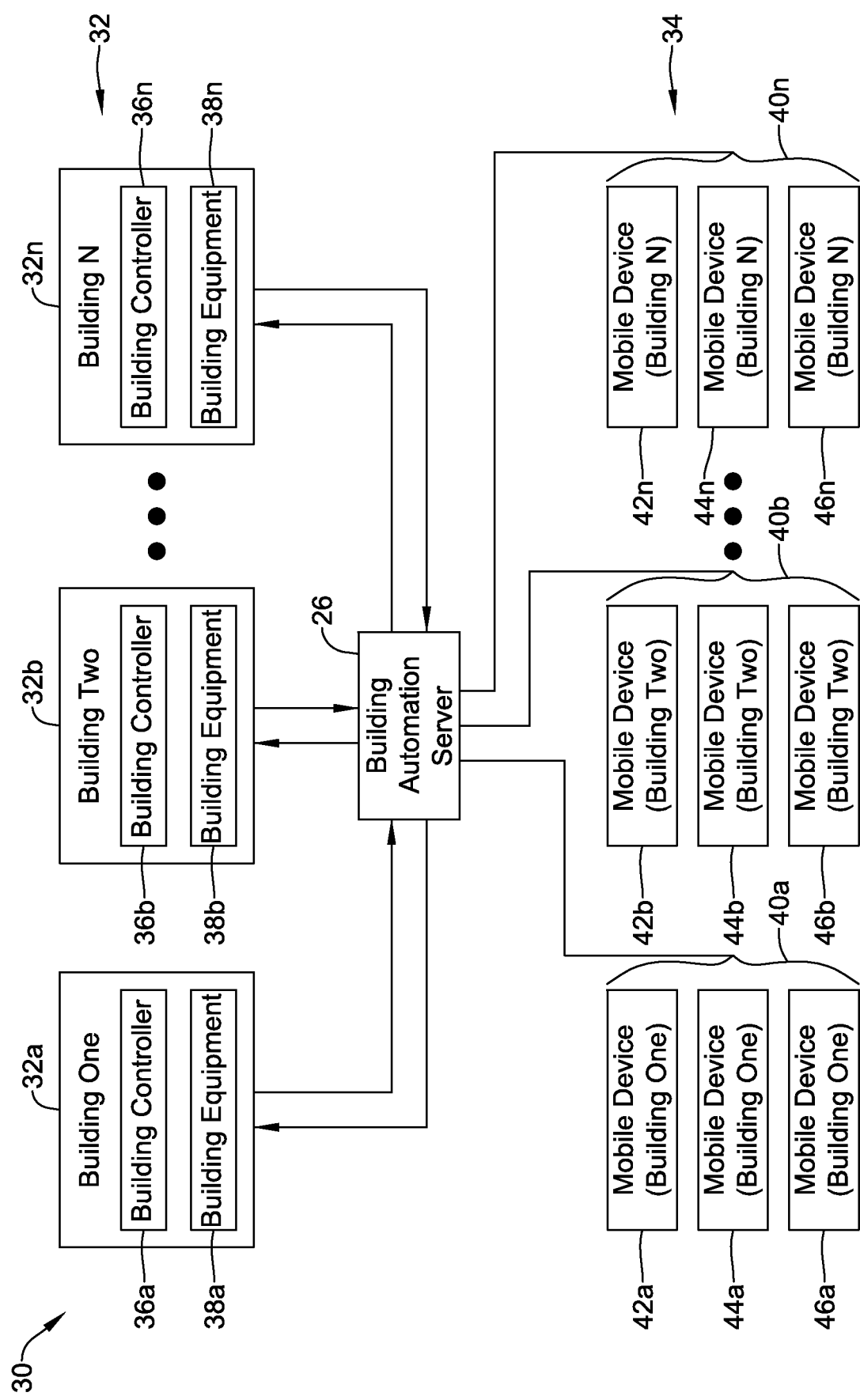
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like. In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smartphones or tablets, may be associated with a particular building, as desired. Each user or occupant of a building may have an associated mobile device, or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26, and may cause the building automation server 26 to provide instructions to the building controller that is associated with the particular mobile device. For example, and in some instances, a mobile phone with location services activated can be used to inform the building automation server 26 as to the whereabouts of the user relative to a geo-fence defined for the associated building, and in some cases an estimate of how long before the user will arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

Figure 4:
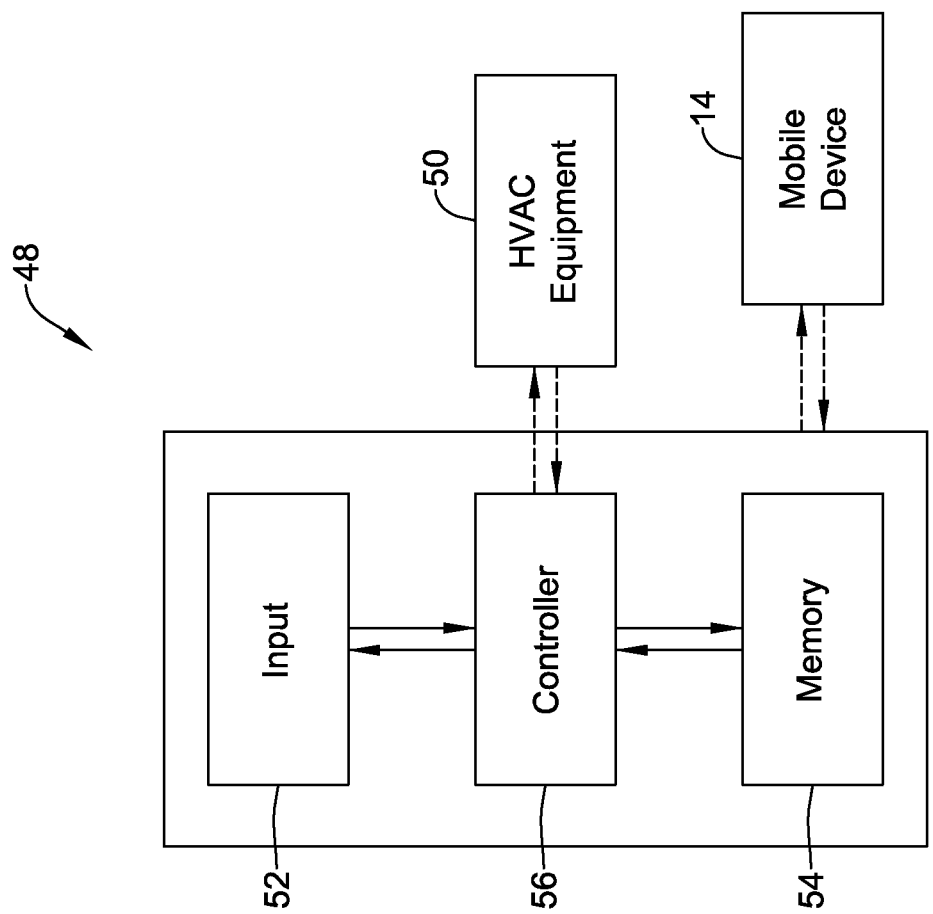
FIG. 4 is a schematic view of an illustrative HVAC control system.

FIG. 4 is a schematic illustration of an HVAC control system 48 that is configured to control operation of HVAC equipment 50 within a user's building. In some instances, the HVAC control system 48 may be considered as being an example or a manifestation of the building automation server 26 described with respect to FIGS. 2 and 3 and is in operative communication with a user's mobile device 14 that is running an executable program providing geo-fencing functionality, such as a geo-fence application program. The illustrative HVAC control system 48 includes an input 52 for receiving crossing information indicating when the user's mobile device 14 crosses into a geo-fence that is defined for the building, a memory 54 for storing the crossing information over time to develop a history of when the user's mobile device 14 crosses into the geo-fence, and a controller 56 that is operatively coupled to the input 52 and the memory 54. The controller 56 may be configured to control either directly or indirectly through an intervening HVAC controller (not illustrated), the HVAC equipment 50 and allow a building temperature in the building to deviate from a comfort temperature set point to an energy saving temperature when the user's mobile device 14 is outside of the geo-fence.

In some instances, the controller 56 may be configured to analyze historical geo-fence crossing data to determine an estimated comfort time. The comfort time is an indication of when the user is expected to cross the geo-fence and/or actually arrive home for a particular day. The historical geo-fence crossing data may, for example, be analyzed to determine an average or mean estimated return time. In some cases, a median or mode may be calculated, or any other useful statistical analysis. The analysis may be based on a set number of previous days, and thus may be updated periodically. In some instances, for example, the analysis may yield a weighted average in which more recent historical geo-fence crossing data is weighed more heavily than older historical geo-fence crossing data.

In some instances, the controller 56 is further configured to use a probability function that operates on at least part of the stored crossing information to predict a time range of when the user's mobile device 14 is expected to next arrive at the building. The time range may have a starting time and an ending time. The controller 56 may be configured to control the HVAC equipment 50 to drive the building temperature to an intermediate temperature that is between the energy saving temperature and the comfort temperature set point by the starting time of the time range.

Figure 5:
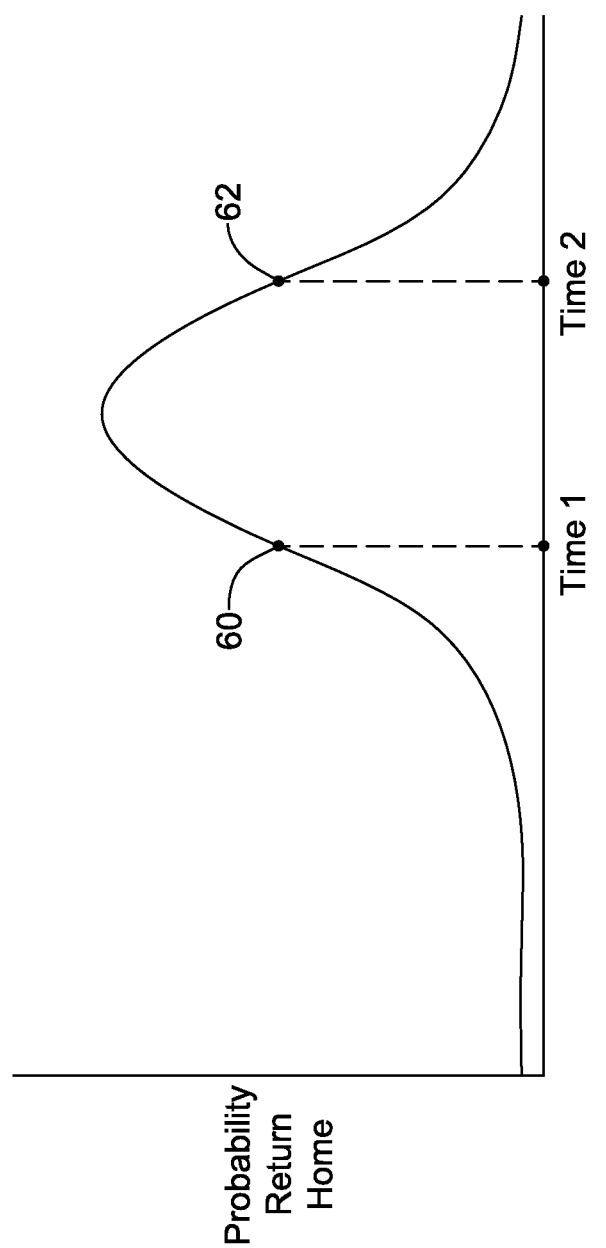
FIGS. 5 and 6 are graphs illustrating features of advanced intelligent recovery in accordance with the disclosure.
Figure 6:
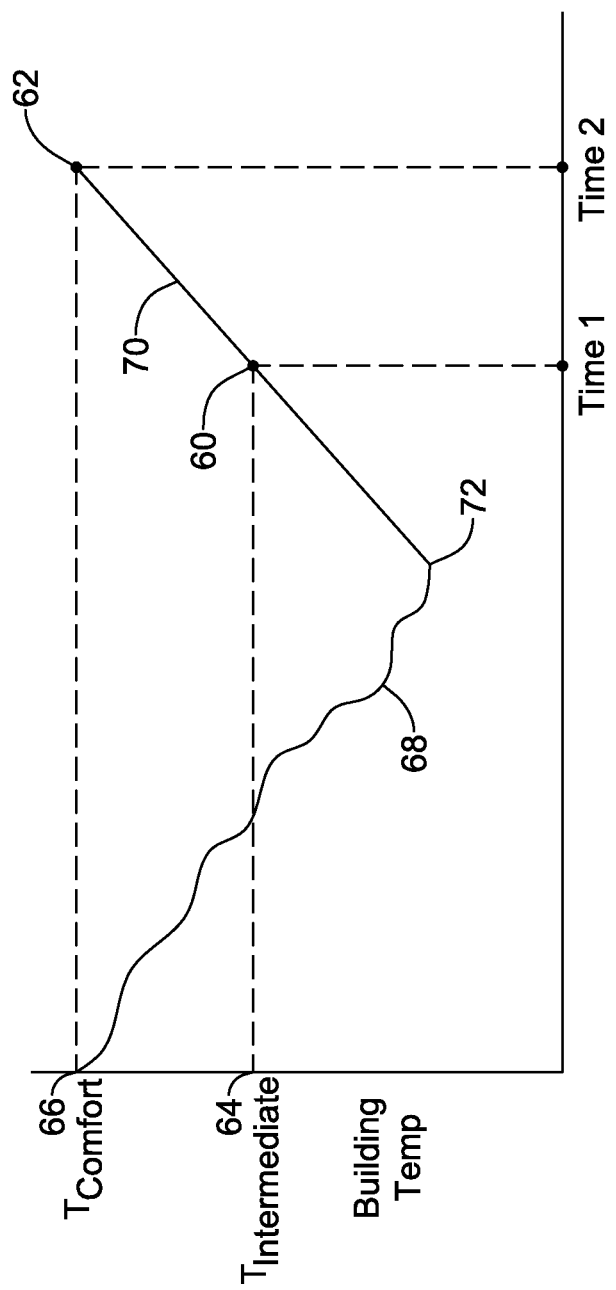

Turning briefly to FIGS. 5 and 6, FIG. 5 is a schematic graphical representation showing a probability of a user returning home at any particular point in time. Time is graphed on the X axis while probability is graphed on the Y axis. By tabulating geo-fence crossing data over time, the controller 56 can determine the relative probability that the user will return home, or at least cross a geo-fence heading for home, at any given point in time. In many cases, as can be seen, the probability curve has a bell-shaped curve that is roughly centered on an average return time. If the user tends to return home within a relatively tight time frame, the peak on the probability curve will be relatively narrow, and the probability curve will have a smaller standard deviation. Conversely, if the user tends to return home over a wider range of time, the peak on the probability curve will be wider, and the probability curve will have a relatively larger standard deviation. In some cases, the controller 56 may track and calculate the relative probability of a return home for a single user, or for each of a plurality of users, and/or for a collection of users.

In some instances, the controller 56 may determine a time range including a starting time and an ending time from a probability distribution. The starting time and the ending time may be determined using any suitable or desirable criteria. In some instances, for example, the time range may have a span that is about equal to one standard deviation, although this is not required. On FIG. 5, a starting point 60 corresponds to a Time-1 while an ending point 62 corresponds to a Time-2. These points 60, 62 are carried forward onto FIG. 6, which is a graph of building temperature versus time. Time is again graphed on the X axis while building temperature is graphed on the Y axis. It can be seen that the starting point 60 corresponds to an intermediate temperature 64 that is between an energy saving temperature and a comfort temperature 66. In some cases, the ending point 62 corresponds to the comfort temperature 66. In some instances, if a single time point such as a comfort time is determined, the comfort time may correspond to Time-1, Time-2 or some intermediate point.

This example shows a heating ramp, although a similar (but opposite in direction) cooling ramp can also be drawn when the HVAC system is in a cooling mode. In the example shown, during the day the building temperature 68 may start at the comfort temperature 66. Once the controller 56 determines that the building is now unoccupied, such as after being notified that all users have crossed the geo-fence in an outward direction, the building temperature 68 may be allowed to drift downward as indicated by building temperature line 68. In some cases, the building temperature 68 will only be allowed to drift downward a certain number of degrees and then hold there until a user is expected to return to the building. In some instances, the number of degrees that the building temperature 68 is allowed to drift may depend on, for example, the radius of the geo-fence, how much warning time the system has been given in the past before a user actually arrives at the building, and/or on any other suitable criteria as desired.

Once the building's HVAC controller is notified of the starting point 60, the desired intermediate temperature 64 that is desired at the starting point 60, the ending point 62, and/or the corresponding comfort temperature 66 that is desired at the ending point 62, the HVAC controller may calculate a heating ramp 70. The heating ramp 70 may be based at least in part upon historical data retained by the HVAC controller with respect to how quickly the HVAC equipment 50 (FIG. 4) can heat the building under the present conditions. The particulars of the heating ramp 70, including the slope of the heating ramp 70 and the starting point 72 may vary, depending on season, local climate, etc. The heating ramp 70 may be calculated in order to help ensure that the building is at the intermediate temperature 64 by the starting point 60 and/or is at the comfort temperature 66 by the ending point 62. This way, if a user returns home at or near the starting point 60, which should be a little earlier than an average or even mean expected return time, the building may not be at the comfort temperature but may at least be reasonably comfortable.

The graphs shown in FIGS. 5 and 6 are schematic and are generic as to day. In some cases, the probability function used by the controller 56 may vary from day to day. For example, people's daily schedules can vary from day to day. In some cases, it may be useful when determining the probability distribution for a particular user returning home on a Monday, Tuesday, Wednesday or Thursday, the controller 56 may utilize historical geo-fence crossing data from Mondays, Tuesdays, Wednesdays and Thursdays. However, when determining a probability distribution for a particular user returning home on a Friday, the controller 56 may utilize historical geo-fence crossing data from Mondays, Tuesdays, Wednesdays, Thursdays and Fridays. In some cases, for weekends, the controller 56 may utilize historical geo-fence crossing data from Saturdays and Sundays. It will be appreciated that this is illustrative only, as other combinations of historical geo-fence crossing data may prove more accurate for a particular situation.

In some instances, the controller 56 may utilize historical data only for specific days. For example, in order to determine the probability distribution for a user returning home on a particular Tuesday, the controller 56 may look only at historical geo-fence crossing data for previous Tuesdays. In some cases, the controller 56 may look at historical data going back a particular length of time, such as the past two weeks, the past month, and so on. Thus, the controller 56 may periodically update its estimates for when a user is expected to return home.

Returning to FIG. 4, while the HVAC control system 48 has thus far been described with respect to a single user, in some cases there may be a plurality of users. In such cases, the input 52 may be configured to receive crossing information indicating when each of a plurality of user's mobile devices 14 cross into the geo-fence associated with the building. In some cases, the memory 54 may be configured to store crossing information over time for each of the plurality of user's mobile devices 14. The controller 56 may, for example, be configured to control the HVAC equipment 50 and allow the building temperature to deviate from the comfort temperature set point to an energy saving temperature when all of the plurality of user's mobile devices 14 are outside the geo-fence. In some cases, the controller 56 may be configured to use a probability function that operates on at least part of the stored crossing information to predict a time range of when each of the plurality of user's mobile devices 14 is expected to next arrive at the building. Each time range may have a starting time and an ending time. In some instances, the controller 56 may control the HVAC equipment to drive the building temperature to an intermediate temperature that is between the energy saving temperature and a comfort temperature set point by the starting time of the time range that corresponds to the user's mobile device 14 that is expected to arrive first at the building.

Figure 7:
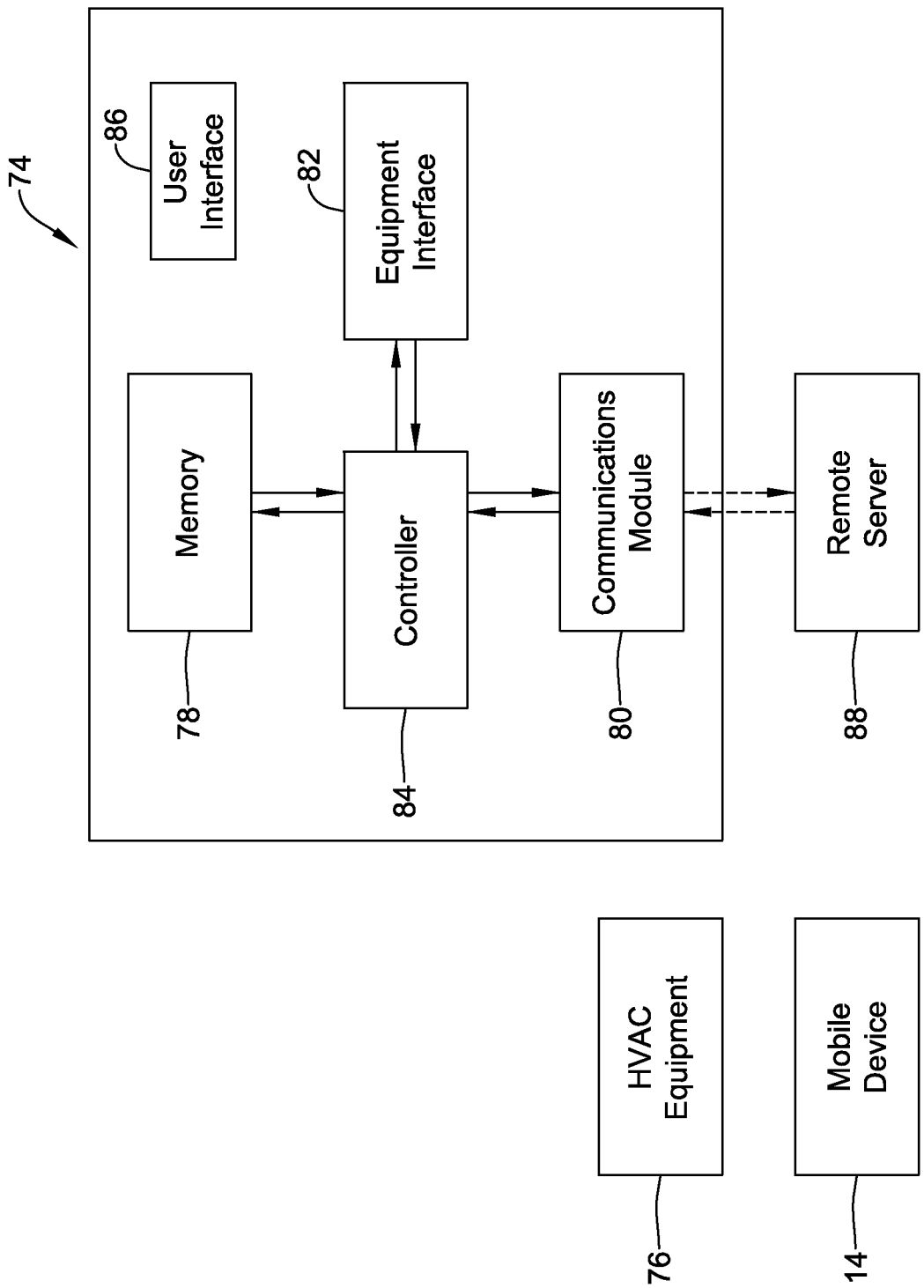
FIG. 7 is a schematic view of an illustrative HVAC controller.

FIG. 7 is a schematic diagram of an illustrative HVAC controller 74 that is configured to operate HVAC equipment 76 that is within a building. A user of the building may have a mobile device 14 with location services. In some cases, the HVAC controller 74 may include a memory 78 for storing at least two targets. One of the at least two targets may include a starting time point, such as the starting time point 60 in FIGS. 5 and 6, and an intermediate temperature, such as the intermediate temperature 64 shown in FIGS. 5 and 6. Another of the at least two targets may include an ending time point, such as the ending time point 62 in FIGS. 5 and 6, and a comfort temperature set point, such as the comfort temperature 66 shown in FIGS. 5 and 6. A communications module 80 may allow the HVAC controller 74 to receive the at least two targets from an external source such as a remote server 88. An equipment interface 82 may be used to provide control signals to the HVAC equipment 76. A controller 84 may be operably coupled to the memory 78, to the communications module 80 and to the equipment interface 82.

The controller 84 may be configured to operate the HVAC equipment 76, via the equipment interface 82, in accordance with at least two targets received via the communications module 80 and stored in the memory 78. In some cases, the controller 84 may calculate one or more heating or cooling ramps, such as the heating ramp 70 illustrated in FIG. 6, based upon the at least two targets such that the building will attain the intermediate temperature set point at a time corresponding to the starting time point and/or the building will attain the comfort temperature set point at or before the ending time point.

In some cases, the at least two targets received from the remote server 88 are calculated by the remote server 88 based, at least in part, upon a probability function that references historical geo-fence crossing data. Optionally, the HVAC controller 74 may include a user interface 86, although this is not required. In some cases, the controller 84 is configured to permit a user to select, using the user interface 86, a balance setting between comfort and energy savings. The selected balance setting may be uploaded to the remote server 88 for use in calculating at least one of the at least two targets. If the user selects a balance weighted towards comfort, the remote server 88 may calculate an intermediate temperature that is relatively closer to the comfort temperature. Conversely, if the user selects a balance weighted towards energy savings, the remote server 88 may calculate an intermediate temperature that is relatively farther away from the comfort temperature. In some cases, the intermediate temperature may be far enough from the comfort temperature that the comfort temperature may not be fully achieved by the ending time point.

Figure 8:
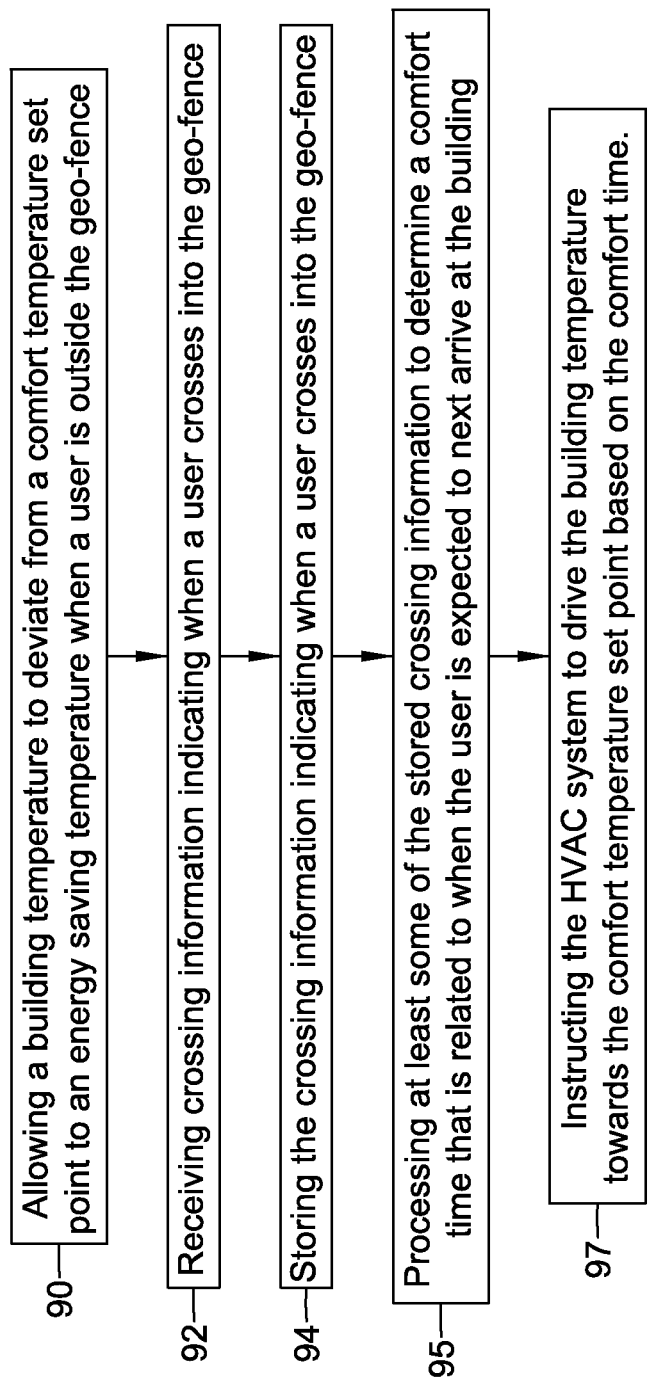
FIG. 8 is a flow diagram showing an illustrative method that may be carried out using the HVAC control system of FIG. 4.

FIG. 8 is a flow diagram of an illustrative method that may be carried out by the HVAC control system 48 and/or the HVAC controller 74, where the HVAC control system 48 implements geo-fencing using a geo-fence that is defined for a building or for one or more individuals associated with the building. A building temperature is allowed to deviate from a comfort temperature set point to an energy saving temperature when a user is outside the geo-fence as indicated at block 90. As seen at block 92, crossing information indicating when a user crosses into the geo-fence may be received. The crossing information may be stored over time to develop a history of when the user crosses into the geo-fence as indicated at block 94. As seen at block 95, at least some of the stored crossing information may be processed to determine a comfort time that is related to when the user is expected to next arrive at the building. For example, the comfort time may be an estimate of when the user will cross the geo-fence on their way home. In some instances, the comfort time may be an estimate of when the user will actually arrive home and thus may factor in the location of the geo-fence and how far from the home the geo-fence is. In some cases, the comfort time may be based at least in part upon an average value of at least some of the stored crossing information. The HVAC system may be instructed to drive the building temperature towards the comfort temperature set point based on the comfort time as seen at block 97. In some cases, the HVAC system may be instructed to drive the building temperature to reach the comfort temperature by the comfort time.

In some embodiments, processing at least some of the stored crossing information includes using a probability function that operates on at least part of the stored crossing information to predict a time range of when the user is expected to next arrive at the building. The time range may have a starting time and an ending time, and the comfort time may be at or between the starting time and/or the ending time. In some cases, the HVAC system may be programmed to drive the building temperature to an intermediate temperature that is between the energy saving temperature and the comfort temperature set point by the starting time of the time range. In some instances, the HVAC system may be instructed to drive the building temperature to the comfort temperature set point by at least the ending time of the time range.

Figure 9:
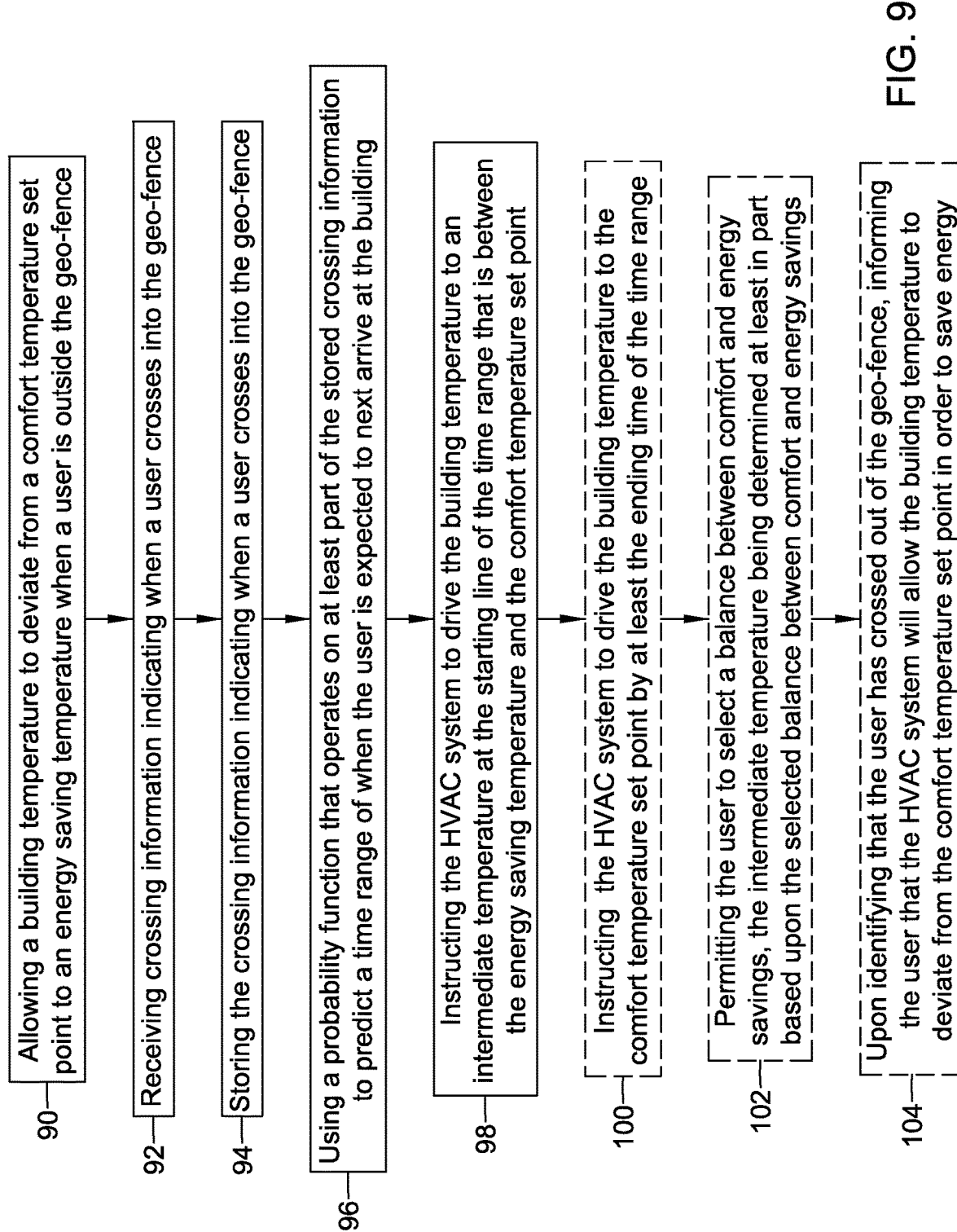
FIG. 9 is a flow diagram showing an illustrative method that may be carried out using the HVAC control system of FIG. 4.

FIG. 9 is a flow diagram of an illustrative method that may be carried out by the HVAC control system 48 and/or the HVAC controller 74, where the HVAC control system 48 implements geo-fencing using a geo-fence that is defined for a building or for one or more individuals associated with the building. A building temperature is allowed to deviate from a comfort temperature set point to an energy saving temperature when a user is outside the geo-fence as indicated at block 90. As seen at block 92, crossing information indicating when a user crosses into the geo-fence may be received. The crossing information may be stored over time to develop a history of when the user crosses into the geo-fence as indicated at block 94. As seen at block 96, a probability function that operates on at least part of the stored crossing information may be used to predict a time range of when the user is expected to next arrive at the building. The time range may have a starting time and an ending time. The HVAC system may be programmed to drive the building temperature to an intermediate temperature that is between the energy saving temperature and the comfort temperature set point by the starting time of the time range, as generally indicated at block 98.

In some embodiments, and as optionally indicated at block 100, the HVAC system may be instructed to drive the building temperature to the comfort temperature set point at least by the ending time of the time range. Optionally, as seen at block 102, the user may be permitted to select a balance between comfort and energy savings. The intermediate temperature being determined at least in part based upon the selected balance between comfort and energy savings. If, for example, the user selects a balance weighted towards comfort, the intermediate temperature is closer to the comfort temperature set point than if the user selects a balance weighted towards energy savings. In some cases, as optionally indicated at block 104, upon identifying that the user has crossed out of the geo-fence, the user may be informed that the HVAC system will allow the building temperature to deviate from the comfort temperature set point in order to save energy. In some cases, the user may be asked if they would like the HVAC system to allow the building temperature to deviate from the comfort temperature set point in order to save energy. In some embodiments, the user may be given the opportunity, via the executable program running on their mobile device 14, to opt out of geo-fencing. If a user selects this, the HVAC control system 48 may ignore the location of that user until the user opts back in.

In some instances, the user may be given the opportunity, via the executable program running on their mobile device 14 to modify or even cancel a recovery towards the comfort temperature set point. For example, if the HVAC system determines that a user is expected home at about 6 pm on a particular day, but the user has plans after work that day, the user can inform the HVAC system to delay the recovery by several hours. As another example, the user may be leaving work early, and thus may wish to instruct the HVAC system to start the recovery at an earlier time. As another example, perhaps the user is going to the airport after work for a short business trip. In this case, the user can inform the HVAC system to cancel the recovery for the particular day, or perhaps maintain an away temperature for the duration of their business trip. In some instances, the user may modify the recovery by altering the temperature set point and/or the estimated time home. It will be appreciated that each of the steps indicated at block 100, 102 and 104 in the illustrative method of FIG. 9 are optional, and can be included or excluded in any particular combination.

Figure 10:
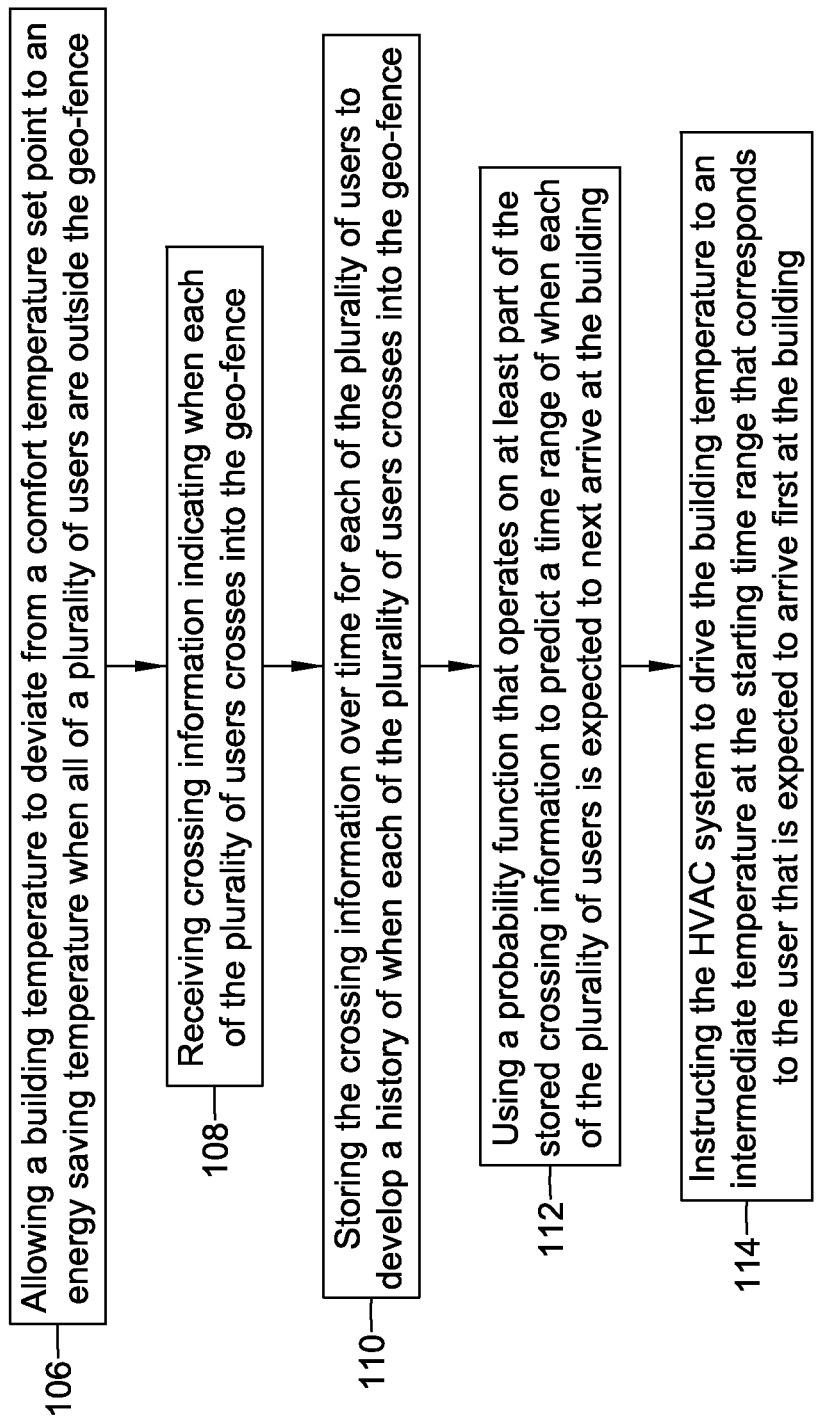
FIG. 10 is a flow diagram showing an illustrative method that may be carried out using the HVAC control system of FIG. 4.

FIG. 10 is a flow diagram of an illustrative method that may be carried out by the HVAC control system 48 and/or the HVAC controller 74, where the HVAC control system 48 implements geo-fencing using a geo-fence that is defined for a building. A building temperature is allowed to deviate from a comfort temperature set point to an energy saving temperature when all of a plurality of users are outside the geo-fence as indicated at block 106. As seen at block 108, crossing information indicating when each of the plurality of users cross into the geo-fence may be received. The crossing information may be stored over time to develop a history of when each of the plurality of users cross into the geo-fence as indicated at block 110. As seen at block 112, a probability function may operate on at least part of the stored crossing information to predict a time range of when each of the plurality of users are expected to next arrive at the building. The time range may have a starting time and an ending time. The HVAC system may be programmed to drive the building temperature to an intermediate temperature that is between the energy saving temperature and the comfort temperature set point by the starting time of the time range that corresponds to the user that is expected to arrive first at the building, s generally indicated at block 114.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of implementing advanced intelligent recovery in an HVAC system for a building, the HVAC system implementing geo-fencing using a geo-fence that is defined for the building or a user of the building, the method comprising:

allowing a building temperature to deviate from a comfort temperature set point to an energy saving temperature when the user is outside the geo-fence as indicated by an outbound geo-fence crossing;

receiving inbound geo-fence crossing information indicating when the user crosses into the geo-fence as indicated by one or more inbound geo-fence crossings;

storing the inbound geofence crossing information over time resulting in historical inbound geo-fence crossing data that indicates historically when the user has crossed into the geo-fence;

processing, for a particular day of a week, the historical inbound geo-fence crossing data for only one or more specific days of the week associated with the particular day of the week to predict a next inbound geo-fence crossing time representative of when the user is expected to next cross into the geo-fence for the particular day of the week, wherein processing the historical inbound geo-fence crossing data that indicates historically when the user has crossed into the geo-fence comprises determining a probability function of a next inbound geo-fence crossing for the user and for the particular day of the week, wherein the probability function indicates, for the user and for each time of a time range of the particular day of the week, a probability that the user will cross into the geo-fence; and instructing the HVAC system to drive the building temperature towards the comfort temperature set point based on the predicted next inbound geo-fence crossing time.

2. The method of claim 1, wherein the predicted next inbound geo-fence crossing time is based, at least in part, on one or more of an average, a median or a mode of at least some of the historical inbound geo-fence crossing data.

3. The method of claim 1, wherein the HVAC system is instructed to drive the building temperature to reach the comfort temperature set point by a comfort time that is based at least in part on the predicted next inbound geo-fence crossing time.

4. The method of claim 3, wherein the time range has a starting time and an ending time, the comfort time at or between the starting time and ending time.

5. The method of claim 4, wherein instructing the HVAC system to drive the building temperature towards the comfort temperature set point based on the comfort time comprises instructing the HVAC system to drive the building temperature to an intermediate temperature at the starting time of the time range, wherein the intermediate temperature is between the energy saving temperature and the comfort temperature set point.

6. The method of claim 4, further comprising:
instructing the HVAC system to drive the building temperature to the comfort temperature set point by at least the ending time of the time range.

7. The method of claim 5, further comprising permitting the user to select a balance between comfort and energy savings, the intermediate temperature being determined at least in part based upon the selected balance between comfort and energy savings.

8. The method of claim 7, wherein if the user selects a balance weighted towards comfort, the intermediate temperature is closer to the comfort temperature set point than if the user selects a balance weighted towards energy savings.

9. The method of claim 1, further comprising, upon identifying that the user has crossed out of the geo-fence, informing the user that the HVAC system will allow the building temperature to deviate from the comfort temperature set point in order to save energy.

10. The method of claim 9, wherein, when the user has crossed out of the geo-fence, querying the user if the user would like the HVAC system to allow the building temperature to deviate from the comfort temperature set point in order to save energy.

11. The method of claim 9, further comprising allowing the user to instruct the HVAC system to modify or cancel a recovery towards the comfort temperature set point.

12. The method of claim 1, further comprising:
allowing the building temperature to deviate from the comfort temperature set point to the energy saving temperature when all of a plurality of users are outside the geo-fence as indicated by outboard geo-fence crossings for each of the plurality of users;
receiving inbound geo-fence crossing information indicating when each of the plurality of users crosses into the geo-fence;
storing the inbound geo-fence crossing information over time for each of the plurality of users resulting in historical inbound geo-fence crossing data for each of the plurality of users, where the historical inbound geo-fence crossing data for each of the plurality of users indicates when each of the plurality of users has crossed into the geo-fence over time;
processing at least some of the historical inbound geo-fence crossing data to predict a next inbound geo-fence crossing time representative of when any of the plurality of users is expected to next cross into the geo-fence; and
instructing the HVAC system to drive the building temperature towards the comfort temperature set point based on the predicted next inbound geo-fence crossing time.

13. The method of claim 1, wherein determining the probability function comprises determining the probability function to vary from another probability function of the next inbound geo-fence crossing for the user and for another day of the week that is different than the particular day.

14. The method of claim 1, wherein the particular day is Tuesday and wherein processing the historical inbound geo-fence crossing data comprises processing the historical inbound geo-fence crossing data only for one or more Tuesdays to predict the next inbound geo-fence crossing time representative of when the user is expected to next cross into the geo-fence for the particular day of the week.

15. An HVAC control system for controlling operation of HVAC equipment within a building, the HVAC control system configured to be in operative communication with a mobile device running an executable program providing geo-fence functionality, the HVAC control system comprising:
an input for receiving inbound crossing information indicating when the mobile device crosses into a geo-fence that is defined for the building;
a memory for storing the inbound crossing information over time resulting in historical inbound geo-fence crossing data that indicates when the mobile device has crossed into the geo-fence;
a controller operatively coupled to the input and the memory, the controller configured to control the HVAC equipment and allow a building temperature in the building to deviate from a comfort temperature set point to an energy saving temperature when the mobile device is outside the geo-fence;
the controller is further configured to determine, for a particular day of a week, a probability function of a next inbound geo-fence crossing for the mobile device and for the particular day of the week based on the stored historical inbound geo-fence crossing data for only one or more specific days of the week associated with the particular day of the week, wherein the probability function indicates, for the mobile device and for each time of a time range of the particular day of the week, a probability that the mobile device will cross into the geo-fence, the time range having a starting time and an ending time; and
the controller is further configured to control the HVAC equipment to drive the building temperature to an intermediate temperature at the starting time of the time range, wherein the intermediate temperature is between the energy saving temperature and the comfort temperature set point.

16. The HVAC control system of claim 15, wherein the controller is further configured to control the HVAC equipment to drive the building temperature to the comfort temperature set point by at least the ending time of the time range.

17. The HVAC control system of claim 15, wherein the energy saving temperature is an energy saving temperature set point.

18. The HVAC control system of claim 15, wherein:
the input is for receiving inbound geo-fence crossing information indicating when each of a plurality of mobile devices cross into the geo-fence;
the memory for storing the inbound geo-fence crossing information over time resulting in historical inbound geo-fence crossing data for each of the plurality of mobile devices;
the controller is configured to control the HVAC equipment and allow the building temperature to deviate from the comfort temperature set point to the energy saving temperature when all of the plurality of mobile devices are outside the geo-fence;
the controller is further configured to use a respective probability function of a next inbound geo-fence crossing for each mobile device of the plurality of mobile devices and for a particular day of a week and that operates on the stored historical inbound geo-fence crossing data to predict a time range of when each of the plurality of mobile devices is expected to next arrive at the building, each time range having a starting time and an ending time; and
the controller is further configured to control the HVAC equipment to drive the building temperature to an intermediate temperature at the starting time of the time range that corresponds to the mobile device of the plurality of mobile devices that is expected to arrive first at the building.

19. An HVAC controller configured to operate HVAC equipment within a building, a user of the building having a mobile device with location services, the HVAC controller comprising:
a memory for storing at least two targets, one of the at least two targets including a starting time point and an intermediate temperature set point, and another of the at least two targets including an ending time point and a comfort temperature set point;
a communications module for receiving the at least two targets from a remote server, the starting time point and the ending time point based at least in part on a probability of an expected return time of the user to the building, wherein the at least two targets received from the remote server are calculated by the remote server based, at least in part, upon a probability function of a next inbound geo-fence crossing for the user and for a particular day of a week and that references, for the particular day of the week, historical inbound geo-fence crossing data for only one or more specific days of the week associated with the particular day of the week, wherein the probability function indicates, for the user and for each time of a time range of the particular day of the week, a probability that the user will cross into the geo-fence;
an equipment interface for providing control signals to the HVAC equipment;
a controller operably coupled to the memory, the communications module and the equipment interface;
the controller configured to operate the HVAC equipment, via the equipment interface, in accordance with at least two targets received via the communications module and stored in the memory; and
the controller further configured to calculate one or more heating or cooling ramps based upon the at least two targets such that the building will attain the intermediate temperature set point at a time corresponding to the starting time point where the starting time point is earlier than an average or mean expected return time, and the building will attain the comfort temperature set point at or before the ending time point.

20. The HVAC controller of claim 19, further comprising a user interface, and wherein the controller is configured to permit the user to select, using the user interface, a balance setting between comfort and energy savings, the selected balance setting being uploaded to the remote server for use in calculating at least one of the at least two targets.

* * * * *